(12) United States Patent
Kim et al.

(10) Patent No.: US 12,549,840 B2
(45) Date of Patent: Feb. 10, 2026

(54) CAMERA MODULE AND ELECTRONIC DEVICE INCLUDING SAME

(71) Applicant: Samsung Electronics Co., Ltd., Suwon-si (KR)

(72) Inventors: Taehwan Kim, Suwon-si (KR); Bongchan Kim, Suwon-si (KR); Hwajoong Jung, Suwon-si (KR); Hyungjin Rho, Suwon-si (KR); Jaeheung Park, Suwon-si (KR); Kwangseok Byon, Suwon-si (KR); Hyosang An, Suwon-si (KR); Jaehyoung Park, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 18/491,143

(22) Filed: Oct. 20, 2023

(65) Prior Publication Data

US 2024/0048835 A1 Feb. 8, 2024

Related U.S. Application Data

(63) Continuation of application No. PCT/KR2022/005807, filed on Apr. 22, 2022.

(30) Foreign Application Priority Data

Apr. 23, 2021 (KR) .......... 10-2021-0053052
Jun. 24, 2021 (KR) .......... 10-2021-0082181

(51) Int. Cl.
*H04N 23/55* (2023.01)
*H04M 1/02* (2006.01)
*H04N 23/54* (2023.01)

(52) U.S. Cl.
CPC .......... *H04N 23/55* (2023.01); *H04M 1/0264* (2013.01); *H04M 1/0277* (2013.01); *H04N 23/54* (2023.01); *H04M 2250/52* (2013.01)

(58) Field of Classification Search
CPC ..... H04N 23/55; H04N 23/54; H04M 1/0264; H04M 1/0277; H04M 2250/52
(Continued)

(56) References Cited

U.S. PATENT DOCUMENTS

2005/0078463 A1    4/2005    Chheda et al.
2008/0078573 A1    4/2008    Hu et al.
(Continued)

FOREIGN PATENT DOCUMENTS

CN    111683454    9/2020
JP    2003195785 A    7/2003
(Continued)

OTHER PUBLICATIONS

International Search Report for PCT/KR2022/005807 mailed Jul. 28, 2022, 5 pages.
(Continued)

*Primary Examiner* — Joel W Fosselman
(74) *Attorney, Agent, or Firm* — Nixon & Vanderhye P.C.

(57) ABSTRACT

According to various embodiments disclosed herein, a camera module and/or an electronic device including same comprises: a lens assembly including at least one lens aligned on an optical axis; a first circuit board that includes an image sensor disposed on the optical axis and is disposed to be movable along two intersecting directions on a plane perpendicular to the optical axis; a second circuit board in which at least one connector is disposed; and a flexible printed circuit board electrically connecting the first circuit board and the second circuit board. The flexible printed circuit board includes: a first end coupled to the first circuit
(Continued)

board; a second end coupled to the second circuit board; a plurality of extensions extending from the first end and connected to the second end; at least one slit disposed between two adjacent extensions among the plurality of extensions; and a plurality of conducting wires arranged in the plurality of extensions, wherein two or more conducting wires selected from among the conducting wires and arranged in different extensions can be connected in parallel.

15 Claims, 20 Drawing Sheets

(58) Field of Classification Search
USPC .......................................................... 348/335
See application file for complete search history.

(56) References Cited

U.S. PATENT DOCUMENTS

| 2008/0083559 | A1 | 4/2008 | Kusamitsu |
| 2009/0201399 | A1 | 8/2009 | Senga |
| 2009/0260860 | A1 | 10/2009 | Pai et al. |
| 2009/0267702 | A1 | 10/2009 | Kim et al. |
| 2015/0359083 | A1 | 12/2015 | Su et al. |
| 2016/0142635 | A1 | 5/2016 | Kaneko et al. |
| 2018/0013938 | A1 | 1/2018 | Choi et al. |
| 2018/0284477 | A1 | 10/2018 | Minamisawa |
| 2019/0141224 | A1 | 5/2019 | Park |
| 2019/0141248 | A1 | 5/2019 | Hubert et al. |
| 2019/0267418 | A1 | 8/2019 | Momiuchi et al. |
| 2020/0022251 | A1 | 1/2020 | Chen |
| 2020/0037434 | A1 | 1/2020 | Ueda et al. |
| 2022/0061151 | A1 | 2/2022 | Oh et al. |
| 2022/0182516 | A1 | 6/2022 | Lee et al. |

FOREIGN PATENT DOCUMENTS

| JP | 2007043129 A | 2/2007 |
| JP | 2011-232707 | 11/2011 |
| JP | 2016176967 A | 10/2016 |
| JP | 2018026395 A | 2/2018 |
| KR | 20090112383 A | 10/2009 |
| KR | 20180005084 A | 1/2018 |
| KR | 20200088048 A | 7/2020 |
| KR | 10-2021-0023195 A | 3/2021 |
| WO | 2017188781 A1 | 11/2017 |
| WO | 2018128082 A1 | 7/2018 |
| WO | 2018235971 A1 | 12/2018 |

OTHER PUBLICATIONS

Written Opinion of the ISA for PCT/KR2022/005807 mailed Jul. 28, 2022, 4 pages.
Extended European Search Report dated Aug. 2, 2024 issued in European Patent Application No. 22792070.9.
Extended European Search Report dated Nov. 5, 2024 issued in European Patent Application No. 22792070.9.

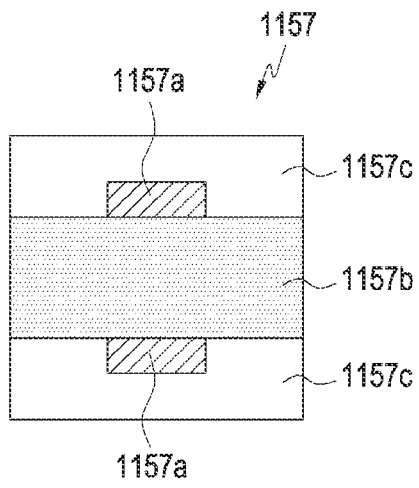
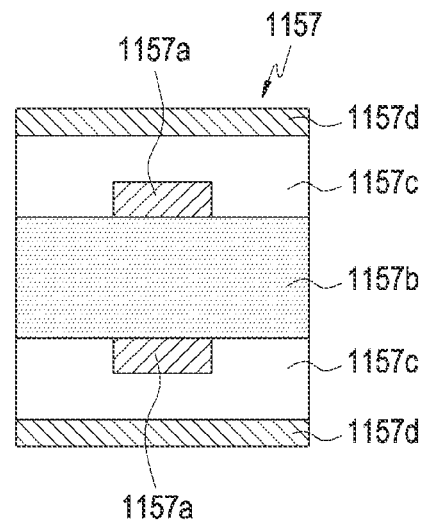
FIG. 24        FIG. 25
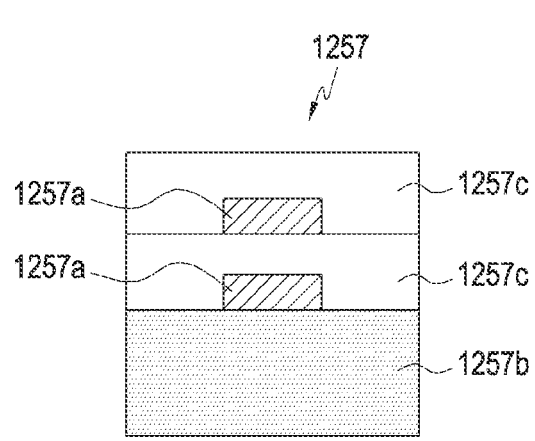
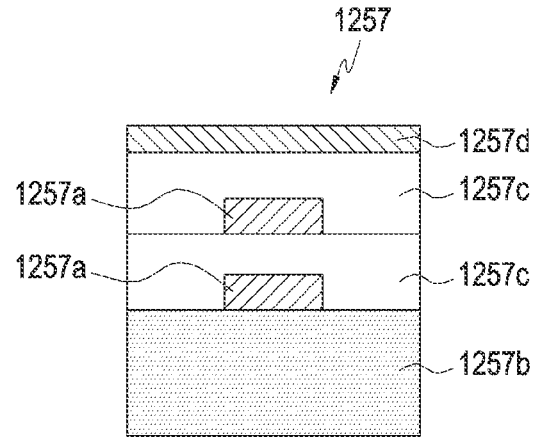
FIG. 26        FIG. 27

CAMERA MODULE AND ELECTRONIC DEVICE INCLUDING SAME

CROSS-REFERENCE TO RELATED APPLICATIONS

This application is a continuation of International Application No. PCT/KR2022/005807 designating the United States, filed on Apr. 22, 2022, in the Korean Intellectual Property Receiving Office and claiming priority to Korean Patent Application Nos. 10-2021-0053052, filed on Apr. 23, 2021, in the Korean Intellectual Property Office, and 10-2021-0082181, filed on Jun. 24, 2021, in the Korean Intellectual Property Office, the disclosures of each of which are incorporated by reference herein in their entireties.

BACKGROUND

Field

The disclosure relates to an electronic device, for example, an electronic device including a camera module.

Description of Related Art

The growth of electronics, information, and communication technologies leads to integration of various functions into a single electronic device. For example, smartphones pack the functionalities of a sound player, imaging device, and scheduler, as well as the communication functionality and, on top of that, may implement more various functions by having applications installed thereon. An electronic device may not only its equipped applications or stored files but also access, wiredly or wirelessly, a server or another electronic device to receive, in real-time, various pieces of information.

As various features are implemented in a single electronic device (e.g., a smartphone), smartphones have taken the place of electronic devices performing designated functions, such as music players, and are gradually invading the realm of video players or recording devices. As small electronic devices may have limited optical performance, the quality of captured images or videos may be enhanced by implementing a capturing function using a plurality of cameras or image sensors. For example, electronic devices, e.g., smartphones, are replacing compact cameras and are expected to take the place of high-end cameras, such as single-lens reflex cameras.

Auto-focusing is commonly equipped in compact electronic devices, e.g., smartphones, and optical image stabilization may contribute to enhancing the quality of captured images or videos. Optical image stabilization may move the lens assembly on the plane perpendicular to the optical axis, compensating for the movement of the electronic device due to a grip or a fixing device and thereby preventing or mitigating the shakes of the captured image or video. However, lens assembly driving-type optical image stabilization may be hard to equip in downsized electronic devices. For example, given the volume of the lens assembly, space for driving, and/or driving components for moving the lens assembly, lens assembly driving-type optical image stabilization may not be included in downsized electronic devices. In an embodiment, optical image stabilization may be implemented by moving the image sensor on the plane perpendicular to the optical axis while fixing the lens assembly on the optical axis. Optical image stabilization in a manner of driving the image sensor which is lighter than the lens assembly may make it easy to secure a space for permitting driving or a space for arranging driving components.

Meanwhile, the image sensor may be electrically connected to other circuit devices such as the processor through signal lines. High-capacity, high-efficiency, and/or high-rate signal lines may be used in transferring high-definition image or video-based signals to other circuit devices. Such signal lines may be implemented through a flexible printed circuit board. However, the repulsive force or elastic restoring force of the flexible printed circuit board may be an obstacle to optical image stabilization. For example, use of high-spec driving components or more power consumption may be required to overcome the repulsive force of the flexible printed circuit board in optical image stabilization.

SUMMARY

Various embodiments of the disclosure may provide a camera module implementing optical image stabilization and easy to downsize and/or an electronic device including the same.

Various embodiments of the disclosure may provide a camera module overcoming the repulsive force or elastic restoring force of the flexible printed circuit board in optical image stabilization and/or an electronic device including the same.

Various embodiments of the disclosure may provide a camera module and/or an electronic device including the same which may save manufacturing costs or power consumption.

According to various example embodiments of the disclosure, a camera module and/or an electronic device including the same may comprise: a lens assembly including at least one lens aligned on an optical axis, a first circuit board including an image sensor disposed on the optical axis and configured to be movable in two directions on a plane perpendicular to the optical axis, the two directions crossing each other, a second circuit board having at least one connector disposed thereon, and a flexible printed circuit board electrically connecting the first circuit board and the second circuit board. The flexible printed circuit board may include: a first end portion coupled to the first circuit board, a second end portion coupled to the second circuit board, a plurality of extensions extending from the first end portion and connected to the second end portion, at least one slit disposed between two adjacent extensions among the plurality of extensions, and a plurality of conducting lines disposed in the plurality of extensions. Two or more selected from among the conducting lines disposed in different extensions are connected in parallel.

According to various example embodiments of the disclosure, an electronic device may comprise a housing and the camera module as described above, which is configured to receive external light from one surface of the housing or another surface facing a direction opposite to the one surface.

According to various example embodiments of the disclosure, as the image sensor or the first circuit board is disposed to be movable on the plane perpendicular to the optical axis, the camera module and/or the electronic device including the same may implement optical image stabilization and be easy to downsize. According to an example embodiment, the flexible printed circuit board electrically connected to the image sensor includes a plurality of slits, thereby reducing the repulsive force and elastic restoring force and implementing seamless optical image stabilization. For example, even without a high-end driving component for optical image stabilization, it is possible to implement seamless optical image stabilization and reduce manufacturing costs or power consumption in optical image stabilization. Other various effects may be provided directly or indirectly in the disclosure.

BRIEF DESCRIPTION OF THE DRAWINGS

The above and other aspects, feature and advantages of certain embodiments of the present disclosure will be more apparent from the following detailed description, taken in conjunction with the accompanying drawings, in which:

FIGS. 21, 22, 23, 24, 25, 26, 27, 28, 29, 30 and 31 are cross-sectional views illustrating another example of one of extensions in a camera module according to various embodiments.

DETAILED DESCRIPTION

Figure 1:
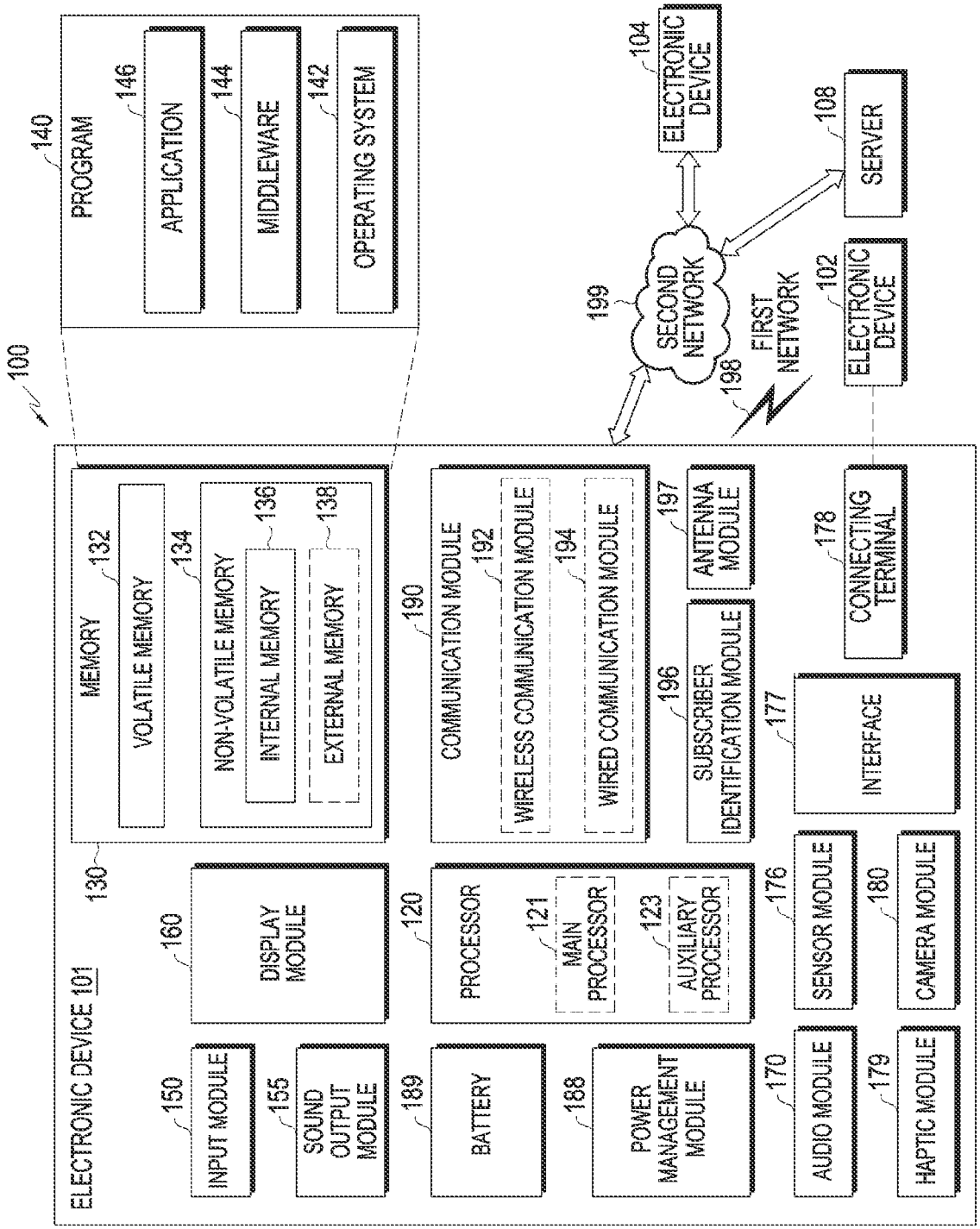
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following detailed description, a length direction, a width direction, and/or a thickness direction of the electronic device may be mentioned and may refer, for example, to a 'Y-axis direction,' 'X-axis direction', and/or 'Z-axis direction,' respectively. In an embodiment, 'negative/positive (−/+)' may be mentioned together with the Cartesian coordinate system illustrated in the drawings with respect to the direction in which the component is oriented. For example, the front surface of the electronic device or housing may be defined as a 'surface facing in the +Z direction,' and the rear surface may be defined as a 'surface facing in the −Z direction'. In an embodiment, the side surface of the electronic device or housing may include an area facing in the +X direction, an area facing in the +Y direction, an area facing in the −X direction, and/or an area facing in the −Y direction. In an embodiment, the 'X-axis direction' may refer, for example, to including both the '−X direction' and the '+X direction'. It should be noted that the directions are so defined with respect to the Cartesian coordinate system shown in the drawings for the sake of brevity of description, and the description of these directions or components do not limit various embodiments of the disclosure.

Figure 2:
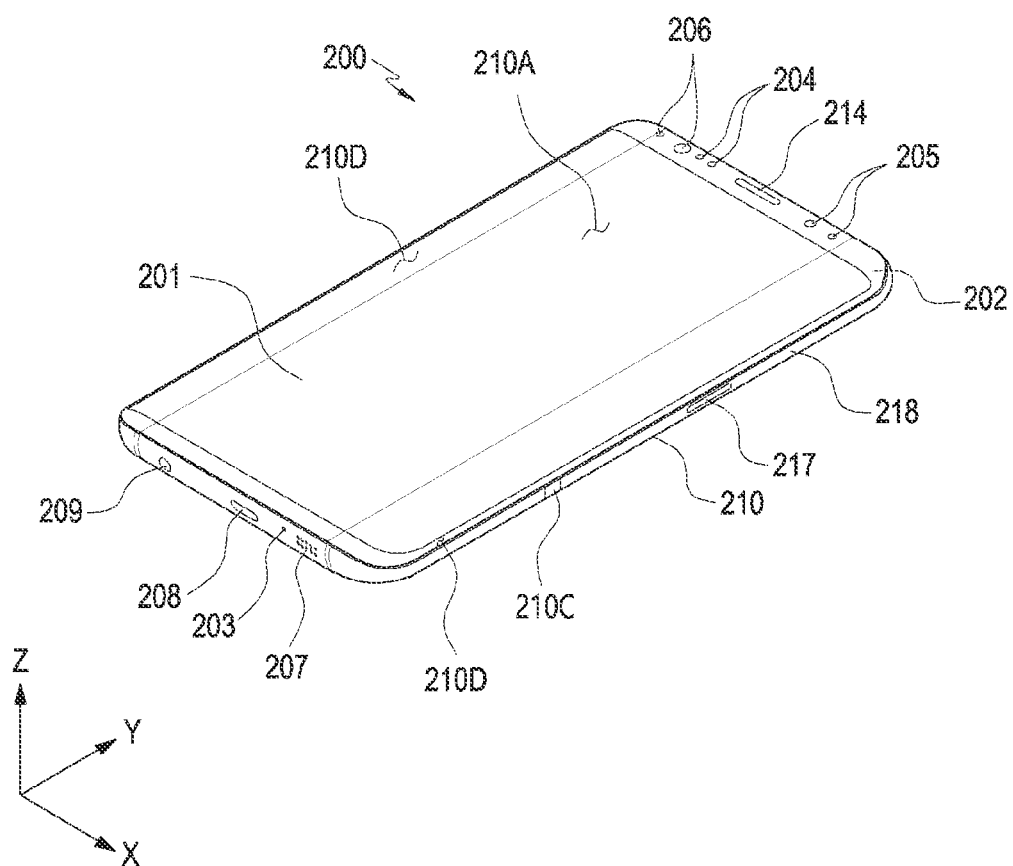
FIG. 2 is a front perspective view illustrating an example electronic device according to various embodiments.
Figure 3:
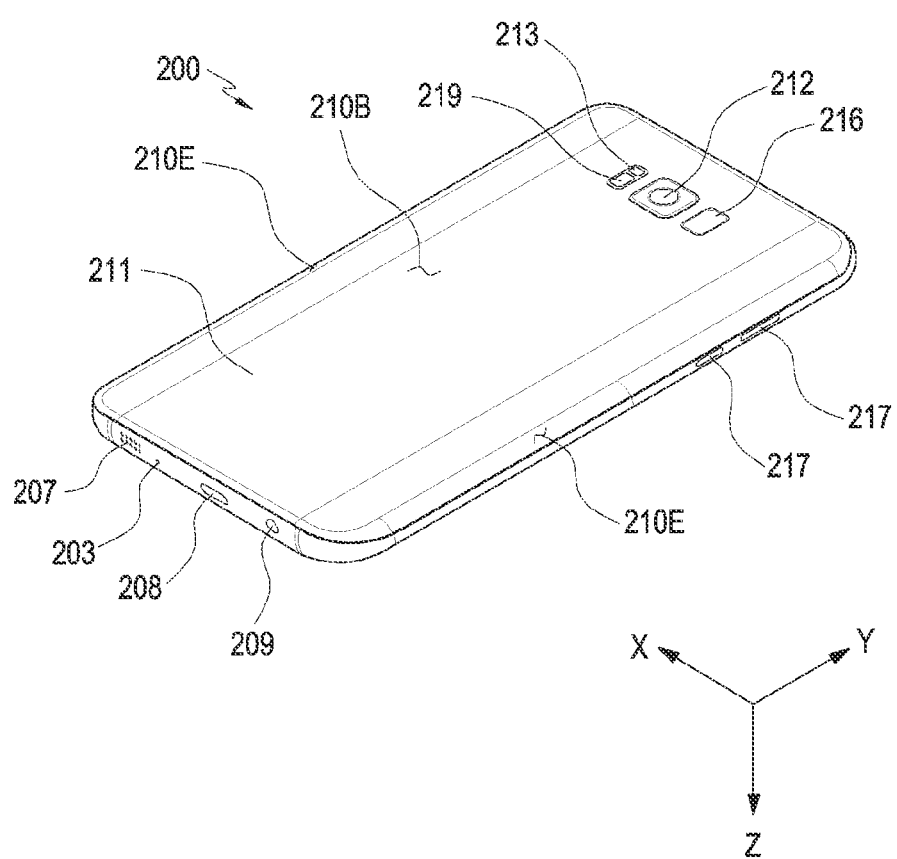
FIG. 3 is a rear perspective view illustrating the electronic device of FIG. 2 according to various embodiments.

FIG. 2 is a front perspective view illustrating an electronic device 200 according to various embodiments. FIG. 3 is a rear perspective view illustrating the electronic device 200 of FIG. 2 according to various embodiments.

Referring to FIGS. 2 and 3, according to an embodiment, an electronic device 200 may include a housing 210 including a first side (or front surface) 210A, a second side (or rear surface) 210B, and a side surface 210C surrounding the space between the first surface 210A and the second surfaces 210B. According to an embodiment (not shown), the housing may denote a structure forming part of the first surface 210A, the second surface 210B, and the side surface 210C of FIG. 2. According to an embodiment, at least part of the first surface 210A may have a substantially transparent front plate 202 (e.g., a glass plate or polymer plate including various coat layers). The second surface 210B may be formed by a rear plate 211 that is substantially opaque. The rear plate 211 may be formed of, e.g., laminated or colored glass, ceramic, polymer, metal (e.g., aluminum, stainless steel (STS), or magnesium), or a combination of at least two thereof. The side surface 210C may be formed by a side structure (or "a side structure") 218 that couples to the front plate 202 and the rear plate 211 and includes a metal and/or polymer. According to an embodiment, the rear plate 211 and the side structure 218 may be integrally formed together and include the same material (e.g., a metal, such as aluminum).

In the embodiment illustrated, the front plate 202 may include two first areas 110D, which seamlessly and bendingly extend from the first surface 210A to the rear plate 211, on both the long edges of the front plate 202. In the embodiment (refer to FIG. 3) illustrated, the rear plate 211 may include second areas 210E, which seamlessly and bendingly extend from the second surface 210B to the front plate 202, on both the long edges. According to an embodiment, the front plate 202 (or the rear plate 211) may include only one of the first areas 210D (or the second areas 210E). Alternatively, the first areas 210D or the second areas 210E may partially be excluded. According to embodiments, at side view of the electronic device 200, the side structure 218 may have a first thickness (or width) for sides that do not have the first areas 210D or the second areas 210E and a second thickness, which is smaller than the first thickness, for sides that have the first areas 210D or the second areas 210E.

According to an embodiment, the electronic device 200 may include at least one or more of a display 201, audio modules 203, 207, and 214, sensor modules 204, 216, and 219, camera modules 205, 212, and 213, key input devices 217, a light emitting device 206, and connector holes 208 and 209. According to an embodiment, the electronic device 200 may exclude at least one (e.g., the key input device 217 or the light emitting device 206) of the components or may add other components.

The display 201 may be visible through a significant portion of the front plate 202. According to an embodiment, at least a portion of the display 201 may be visible through the front plate 202 forming the first surface 210A and the first areas 210D of the side surface 210C. According to an embodiment, the edge of the display 201 may be formed to be substantially the same in shape as an adjacent outer edge of the front plate 202. According to an embodiment (not shown), the interval between the outer edge of the display 201 and the outer edge of the front plate 202 may remain substantially even to give a larger area of exposure the display 201.

According to an embodiment (not shown), the screen display area of the display 201 may have a recess or opening in a portion thereof, and at least one or more of the audio module 214, sensor module 204, camera module 205, and light emitting device 206 may be aligned with the recess or opening. According to an embodiment (not shown), at least one or more of the audio module 214, sensor module 204, camera module 205, fingerprint sensor 216, and light emitting device 206 may be included on the rear surface of the screen display area of the display 201. According to an embodiment (not shown), the display 201 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 204 and 219 and/or at least part of the key input devices 217 may be disposed in the first areas 210D and/or the second areas 210E.

The audio modules 203, 207, and 214 may include a microphone hole 203 and speaker holes 207 and 214. The microphone hole 203 may have a microphone inside to obtain external sounds. According to an embodiment, there may be a plurality of microphones to be able to detect the direction of a sound. The speaker holes 207 and 214 may include an external speaker hole 207 and a phone receiver hole 214. According to an embodiment, the speaker holes 207 and 214 and the microphone hole 203 may be implemented as a single hole, or speakers may be included without the speaker holes 207 and 214 (e.g., piezo speakers).

The sensor modules 204, 216, and 219 may generate an electrical signal or data value corresponding to an internal operating state or external environmental state of the electronic device 200. The sensor modules 204, 216, and 219 may include a first sensor module 204 (e.g., a proximity sensor) disposed on the first surface 210A of the housing 210, and/or a second sensor module (not shown) (e.g., a fingerprint sensor), and/or a third sensor module 219 (e.g., a heart-rate monitor (HRM) sensor) disposed on the second surface 210B of the housing 210, and/or a fourth sensor module 216 (e.g., a fingerprint sensor). The fingerprint sensor may be disposed on the second surface 210B as well as the first surface 210A (e.g., the display 201) of the housing 210. The electronic device 200 may further include the sensor module of FIG. 1, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212, and 213 may include a first camera device 205 disposed on the first surface 210A of the electronic device 200, and a second camera device 212 and/or a flash 213 disposed on the second surface 210B. The camera devices 205 and 212 may include one or more lenses, an image sensor, and/or an image signal processor. The flash 213 may include, e.g., a light emitting diode (LED) or a xenon lamp. According to an embodiment, two or more lenses (an infrared (IR) camera, a wide-angle lens, and a telephoto lens) and image sensors may be disposed on one surface of the electronic device 200.

The key input device 217 may be disposed on the side surface 210C of the housing 210. According to an embodiment, the electronic device 200 may exclude all or some of the above-mentioned key input devices 217 and the excluded key input devices 217 may be implemented in other forms, e.g., as soft keys, on the display 201. According to an embodiment, the key input device may include the sensor module 216 disposed on the second surface 210B of the housing 210.

The light emitting device 206 may be disposed on, e.g., the first surface 210A of the housing 210. The light emitting device 206 may provide, e.g., information about the state of the electronic device 200 in the form of light. According to an embodiment, the light emitting device 206 may provide a light source that interacts with, e.g., the camera module 205. The light emitting device 206 may include, e.g., a light emitting diode (LED), an infrared (IR) LED, or a xenon lamp.

The connector holes 208 and 209 may include a first connector hole 208 for receiving a connector (e.g., a universal serial bus (USB) connector) for transmitting or receiving power and/or data to/from an external electronic device and/or a second connector hole 209 (e.g., an earphone jack) for receiving a connector for transmitting or receiving audio signals to/from the external electronic device.

Figure 4:
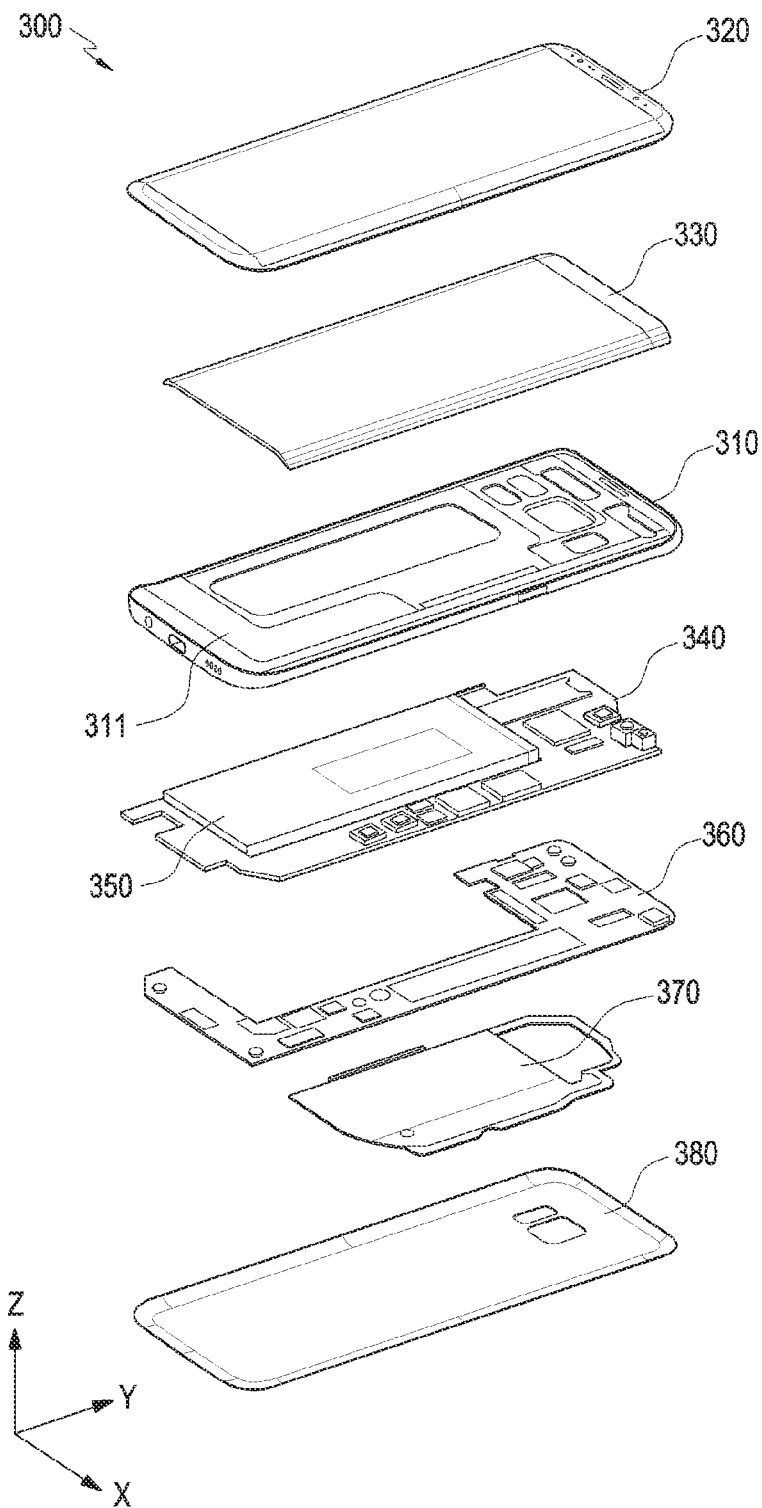
FIG. 4 is an exploded perspective view illustrating the electronic device of FIG. 2 according to various embodiments.

FIG. 4 is an exploded perspective view illustrating the electronic device 300 of FIG. 2 according to various embodiments.

Referring to FIG. 4, an electronic device 300 may include a side structure 310, a first supporting member 311 (e.g., a bracket), a front plate 320, a display 330, a printed circuit board 340, a battery 350, a second supporting member 360

(e.g., a rear case), an antenna 370, and a rear plate 380. According to an embodiment, the electronic device 300 may exclude at least one (e.g., the first supporting member 311 or the second supporting member 360) of the components or may add other components. At least one of the components of the electronic device 300 may be the same or similar to at least one of the components of the electronic device 200 of FIG. 2 or 3 and duplicate description may not be repeated below.

The first supporting member 311 may be disposed inside the electronic device 300 to be connected with the side surface structure 310 or integrated with the side surface structure 310. The first supporting member 311 may be formed of, e.g., a metal and/or non-metallic material (e.g., polymer). The display 330 may be joined onto one surface of the first supporting member 311, and the printed circuit board 340 may be joined onto the opposite surface of the first supporting member 311. A processor, memory, and/or interface may be mounted on the printed circuit board 340. The processor may include one or more of, e.g., a central processing unit, an application processor, a graphic processing device, an image signal processing, a sensor hub processor, or a communication processor. The processor may include various processing circuitry, and as used herein, including the claims, the term "processor" may include various processing circuitry, including at least one processor, wherein one or more processors of the at least one processor may be configured to perform the various functions described herein.

The memory may include, e.g., volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multimedia card (MMC) connector, or an audio connector.

The battery 350 may be a device for supplying power to at least one component of the electronic device 300. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 300.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment of the present disclosure, an antenna structure may be formed by a portion or combination of the side structure 310 and/or the first supporting member 311.

It should be noted that in the following detailed description, reference may be made to the electronic devices 101, 102, 104, 200, and 300 of the foregoing embodiments, and components, which may easily be understood through the foregoing embodiments, are assigned the same reference numerals and a description thereof may not be provided.

Figure 5:
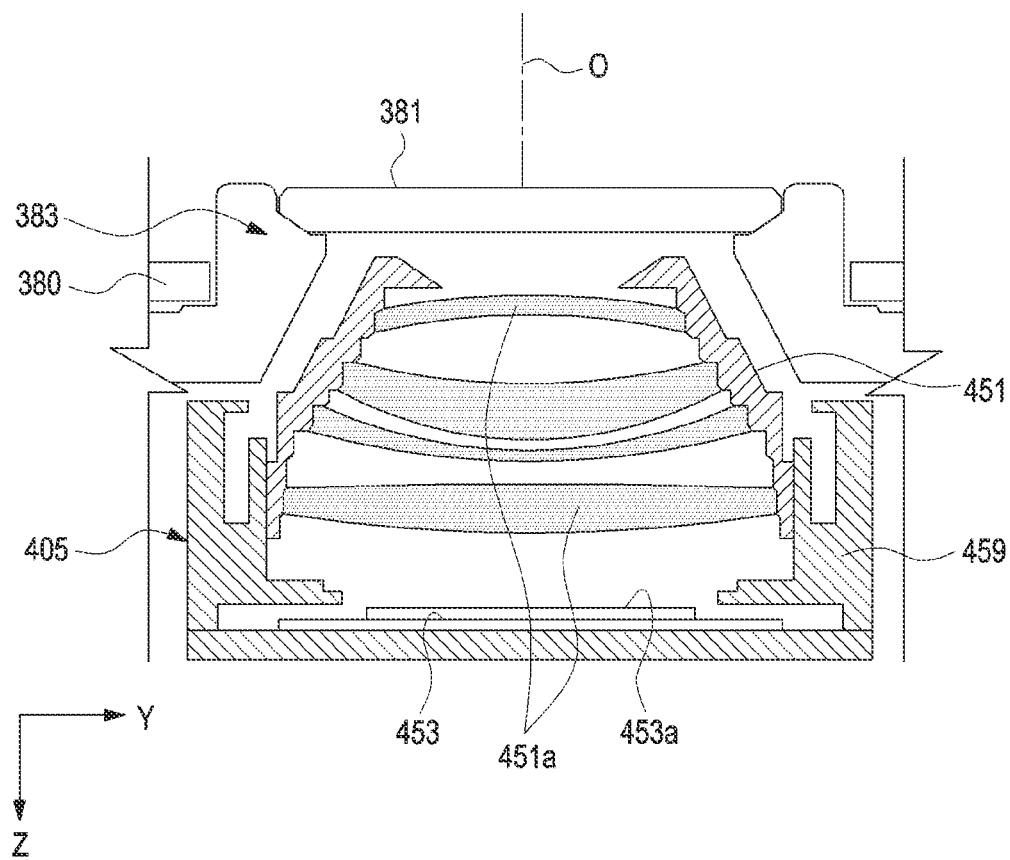
FIG. 5 is a cross-sectional view illustrating an example configuration in which a camera module is disposed according to various embodiments.
Figure 6:
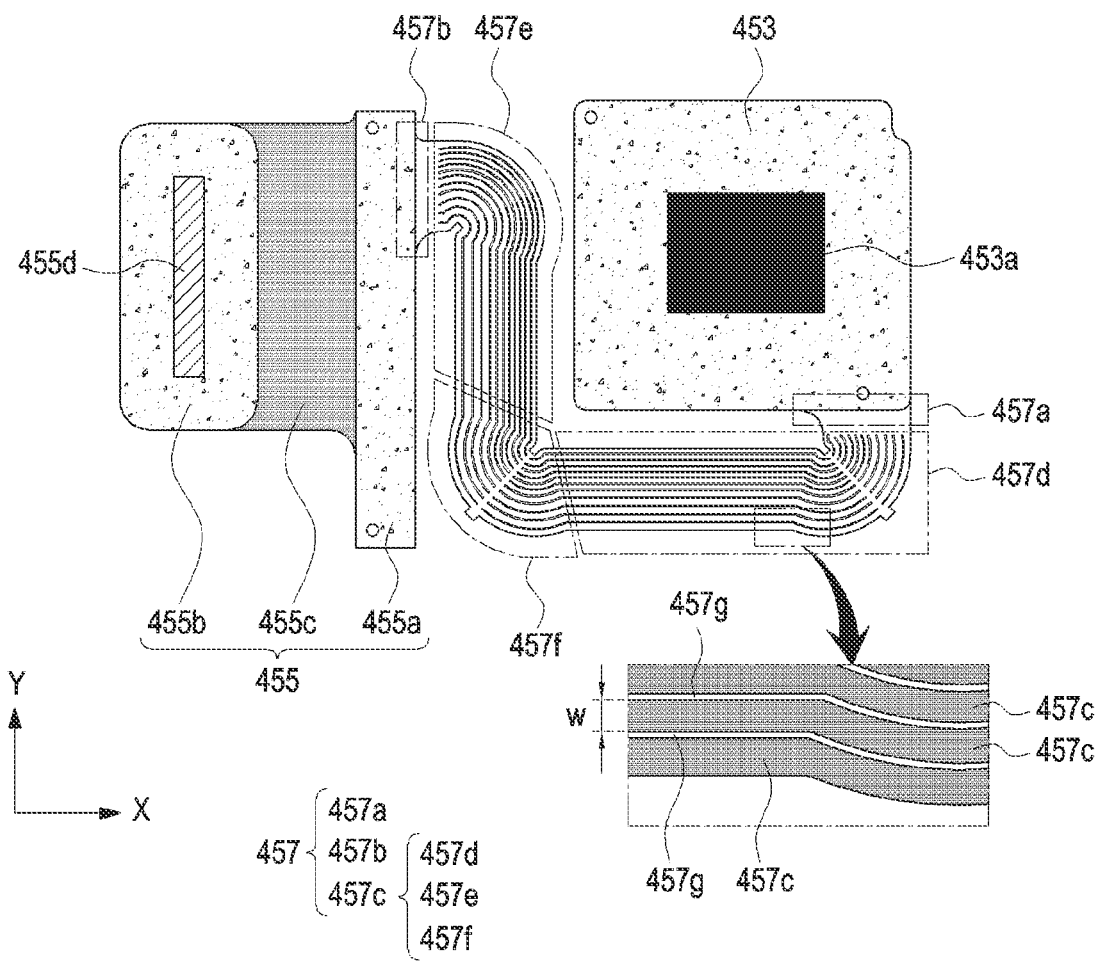
FIG. 6 is a diagram illustrating a plan view illustrating circuit boards of a camera module according to various embodiments.

FIG. 5 is a cross-sectional view illustrating an example configuration in which a camera module 405 is disposed according to various embodiments. FIG. 6 is a diagram illustrating a plan view illustrating circuit boards 453, 455, and 457 of a camera module 405 according to various embodiments.

Referring to FIGS. 5 and 6, a camera module 405 may include a lens assembly 451, a first circuit board 453 including an image sensor 453a, a second circuit board 455 including at least one connector 455d, and/or a flexible printed circuit board 457 that electrically connects the first circuit board 453 and the second circuit board 455. The image sensor 453a may be electrically connected to a main circuit board or a processor (e.g., the printed circuit board 340 of FIG. 4 or the processor 120 of FIG. 1) through the first circuit board 453, the flexible printed circuit board 457, and/or the second circuit board 455.

According to various embodiments, the first area 455a and the second area 455b of the second circuit board 455 may be formed of a rigid material and be connected through a third area 455c formed of a flexible material. However, various embodiments of the disclosure are not limited thereto, and the entire second circuit board 455 may be formed of a rigid material or a flexible material. In an embodiment, the second circuit board 455 may be formed of a flexible material and may be substantially a partial area of the flexible printed circuit board 457, and a reinforcing plate (not shown) of a rigid material may be disposed in an area (e.g., the second area 455b) in which the connector 455d is disposed. In an embodiment, the first circuit board 453 may be formed of a rigid material, and an image sensor 453a may be disposed on one surface thereof. In an embodiment, the first circuit board 453 may be formed of a flexible material and may be another partial area of the flexible printed circuit board 457. When the first circuit board 453 is formed of a flexible material, a reinforcing plate (not shown) formed of a rigid material may be disposed in an area in which the image sensor 453a is disposed.

According to various embodiments, an electronic device (e.g., the electronic device 200 or 300 of FIGS. 2, 3 and 4) may include a decoration member 383 disposed to penetrate the rear plate 380 and providing a path through which external light is incident (hereinafter, referred to as a "capturing path"). A portion of the decoration member 383 may be disposed or coupled to the inner surface of the rear plate 380, and another portion of the decoration member 383 may be shaped to penetrate the rear plate 380 to define a capturing path. In an embodiment, the capturing path is substantially in the shape of a hole penetrating the decoration member 383, and the electronic device 300 may include a window 381 for transmitting light, thereby closing the hole of the decoration member 383.

According to various embodiments, the camera module 405 and/or the lens assembly 451 may include at least one lens 451a aligned on the optical axis O, and may be disposed inside a housing (e.g., the housing 210 of FIG. 2 or the side structure 310 of FIG. 3) while facing the window 381. The electronic device 300 and/or the processor 120 may perform autofocusing by moving the lens assembly 451 forward and backward in the optical axis O direction (e.g., the Z-axis direction). For example, a space in which the lens assembly 451 may move forward and backward may be provided inside the window 381 and/or the decoration member 383.

According to various embodiments, the first circuit board 453 may be disposed to be movable on a plane substantially perpendicular to the optical axis O with respect to the window 381 or the lens assembly 451 while disposing the image sensor 453a on the optical axis O. For example, the image sensor 453a and/or the first circuit board 453 may move in at least one of two directions (e.g., the X-axis direction and the Y-axis direction) crossing each other on the plane substantially perpendicular to the optical axis O. In an embodiment, when the first circuit board 453 moves within one plane, the two directions may be substantially perpendicular to each other, and the relative positions or arrangement of the two directions may vary according to embodiments.

According to various embodiments, the electronic device 300 or a sensor module (e.g., a gyro sensor and/or an acceleration sensor as one of the sensor module 176 of FIG. 1) may be configured to detect a vibration of the housing 210, and the electronic device 300 or the processor 120 may move the first circuit board 453 in at least one of two directions based on the vibration detected through the sensor module 176. In an embodiment, the electronic device 300 or the processor 120 may identify whether the vibration detected by the sensor module 176 is the shaking of the user's hand, and may move the first circuit board 453 when it is identified as the shaking of the user's hand. Identifying vibration in a general use environment and hand shaking in capturing may be based on data related to the acceleration, direction, and/or strength of vibration, and such data may be stored in the electronic device 300 and/or memory (e.g., the memory 130 of FIG. 1). Here, the term "vibration" may refer, for example, to a tremor in a device for fixing the electronic device 300 or of the user's hand, and may cause quality deterioration of the captured image or video. For example, in capturing, the first circuit board 453 may move on the plane substantially perpendicular to the optical axis O, thereby compensating for vibration of the housing 210 caused by an external force and enhancing the quality of the captured image or image.

According to various embodiments, the electronic device 300 and/or the camera module 405 may further include a casing 459, and the casing 459 may connect or couple the lens assembly 451 and the first circuit board 453. For example, the lens assembly 451 may be disposed on the casing 459 to move forward and backward in the direction of the optical axis O, and the image sensor 453a may be disposed in the casing 459 to be movable on the plane substantially perpendicular to the direction of the optical axis 459. Although not illustrated, the casing 459 may be utilized as a structure for coupling or fixing the camera module 405 to the housing 210 or a printed circuit board (e.g., the side structure 310 or the printed circuit board 340 of FIG. 4).

According to various embodiments, the second circuit board 455 may include a connector 455d coupled to the printed circuit board 340. For example, the camera module 405 may be electrically connected to the printed circuit board 340 substantially through the second circuit board 455 and/or the connector 455d. According to an embodiment, the second circuit board 455 may include a first area 455a connected to the flexible printed circuit board 457, a second area 455b in which the connector 455d is disposed, and/or a third area 455c electrically connecting the first area 455a and the second area 455b. As mentioned above, the first area 455a and the second area 455b may be formed of a rigid material, and the third area 455c may be formed of a flexible material. In an embodiment, the entire second circuit board 455 may be formed of any one of a rigid material and a flexible material, and when formed of a flexible material, the second circuit board 455 may be substantially a part of the flexible printed circuit board 457.

According to various embodiments, the flexible printed circuit board 457 may include a first end portion 457a, a second end portion 457b, a plurality of extensions 457c, at least one slit 457g, and/or a plurality of conducting lines (e.g., the conducting lines 1057a and 1457a of FIG. 20 or FIG. 32), and may electrically connect the first circuit board 453 and the second circuit board 455. In an embodiment, the first end portion 457a may be electrically coupled with the first circuit board 453, and the second end portion 457b may be electrically coupled with the second circuit board 455 (e.g., the first area 455a). In an embodiment, the first end portion 457a may be at least partially fixed to the first circuit board 453 and the second end portion 457b may be at least partially fixed to the second circuit board 455.

According to various embodiments, the extensions 457c may extend from the first end portion 457a to be connected to the second end portion 457b, and the slit(s) 457g may be formed between two adjacent extensions 457c. For example, the extension portions 457c and the slit(s) 457g may be alternately disposed. In an embodiment, the flexible printed circuit board 457 may be disposed substantially parallel to the plane on which the first circuit board 453 moves. In an embodiment, as an arrangement structure or an external force is applied, the flexible printed circuit board 457 may be at least partially deformable or movable. In this case, at least a portion of the flexible printed circuit board 457 may not be parallel to the plane on which the first circuit board 453 moves.

According to various embodiments, as the extensions 457c and the at least one slit 457g are alternately disposed between the first end portion 457a and the second end portion 457b, the repulsive force or elastic restoring force of the flexible printed circuit board 457 may be reduced compared to a structure in which the slits 457g are not disposed. For example, compared with the structure in which the entire area in which the extensions 457c are arranged in FIG. 6 is formed of a film (e.g., the base film 1057b of FIG. 20) or an insulator (e.g., the insulator 1057c of FIG. 20), the flexible printed circuit board 457 in which the extensions 457c and the slit(s) 457g are alternately arranged may be more flexible. The elastic modulus k of a general flexible printed circuit board or where the slits 457g are not disposed or the extension may be defined by Equation 1 below.

$$k = \frac{Ebh^3}{l^3} \qquad \text{[Equation 1]}$$

Here, "E" may refer to the longitudinal elastic modulus by the material of the film, the insulation layer, and/or the conducting line(s), "b" may refer to the thickness of the extension, "h" may refer to the width of the extension, and "l" may refer to the length of the extension. When 10 extensions 457c and slits 457g are alternately arranged while having the same width and/or length (e.g., the same wiring area) as that of a general flexible printed circuit board, e.g., in FIG. 6, when the flexible printed circuit board 457 includes 10 extensions 457c, the elastic modulus k of all the extensions 457 may be defined as Equation 2 below.

$$k = 10 \times \frac{Eb\left(\frac{h}{10}\right)^3}{l^3} = \frac{1}{100}\frac{Ebh^3}{l^3} \qquad \text{[Equation 2]}$$

For example, as the number of the extensions 457c and the slits 457g increases, the repulsive force and/or elastic restoring force by the flexible printed circuit board 457 and/or the extensions 457c in optical image stabilization may be reduced, and optical image stabilization may be facilitated.

According to various embodiments, when viewed in a direction parallel to the optical axis O, e.g., the Z-axis direction of FIG. 5, the width of the slit(s) 457g may be smaller than the width w of the extensions 457c. For example, although not limited to the illustrated numbers, one extension 457c may have a width w of about 120 μm, and the slit(s) 457g may have a width of about 25 μm and/or a width smaller than that.

According to various embodiments, a laser cutting method may be used in forming the slits 457g. If the width of the slit 457g increases, forming one slit 457g requires irradiating the slit 457g with the laser beam along the trajectory of the slit 457g and, as the number of times in which the laser beam is radiated increases, manufacturing costs or time may increase. For example, the width w of one extension 457c may be selected considering the number of conducting lines 1057a and 1457a disposed in one extension 457c or the widths of the conducting lines 1057a and 1457a, and the slit 457g may have a width (e.g., about 25 μm or less) that may be formed by laser cutting once on the flexible printed circuit board 457.

According to various embodiments, the extension(s) 457c may include a first section 457d and a second section 457e and, according to an embodiment, may further include a third section 457f. It is noted that dividing the extension(s) 457c into a plurality of sections is for convenience or brevity of description, and such dividing does not limit various embodiments of the disclosure. For example, the third section 457f may be a portion of any one of the first section 457d or the second section 457e. According to an embodiment, the first section 457d may extend along the first direction (e.g., the X-axis direction) and may be disposed side by side with a portion of the side surface (e.g., one side surface facing in the Y-axis direction) of the first circuit board 453, and the second section 457e may extend along the second direction (e.g., the Y-axis direction) crossing the first direction and may be disposed side by side with another portion (e.g., one side surface facing in the X-axis direction) of the side surface of the first circuit board 453. As is described below, it is noted that the direction or position in which the first section 457d or the second section 457e is disposed may vary, and is not limited to the configuration mentioned herein.

According to various embodiments, the second section 457e may be deformed or moved when the first circuit board 453 moves in the first direction (e.g., the X-axis direction), and the first section 457d may be deformed or moved when the first circuit board 453 moves in the second direction (e.g., the Y-axis direction). For example, the first section 457d and the second section 457e may allow the first circuit board 453 to move in two directions crossing each other in optical image stabilization, and the slits 457g formed in the extension 457c (e.g., the first section 457d and the second section 457e) may reduce the repulsive force or elastic restoring force of the flexible printed circuit board 457 generated in optical image stabilization.

According to various embodiments, the third section 457f is a section connecting the first section 457d and the second section 457e, and may have a curved shape or an arc shape (or trajectory). As is described below, the third section 457f may be disposed to be inclined with respect to the first direction or the second direction to connect the first section 457d and the second section 457e. According to an embodiment, in optical image stabilization, when the first section 457d and the second section 457e are relatively deformed or moved, partial stress may be generated on the flexible printed circuit board 457 (e.g., the extension 457c). The third section 457f may disperse the stress generated in optical image stabilization, thereby enhancing the durability or reliability of the flexible printed circuit board 457. When viewed in plan view, e.g., when viewed in the Z-axis direction, the flexible printed circuit board 457 may further include curved portion(s) similar to the third section 457f. For example, a connection portion between the extension 457c and the first end portion 457a or a connection portion between the extension 457c and the second end portion 457b may have an arc shape similar to that of the third section 457f, thereby dispersing stress that may occur on the flexible printed circuit board 457.

In the following description, the components easy to understand from the description of the above embodiments are denoted with or without the same reference numerals and their detailed description may be skipped.

Figure 7:
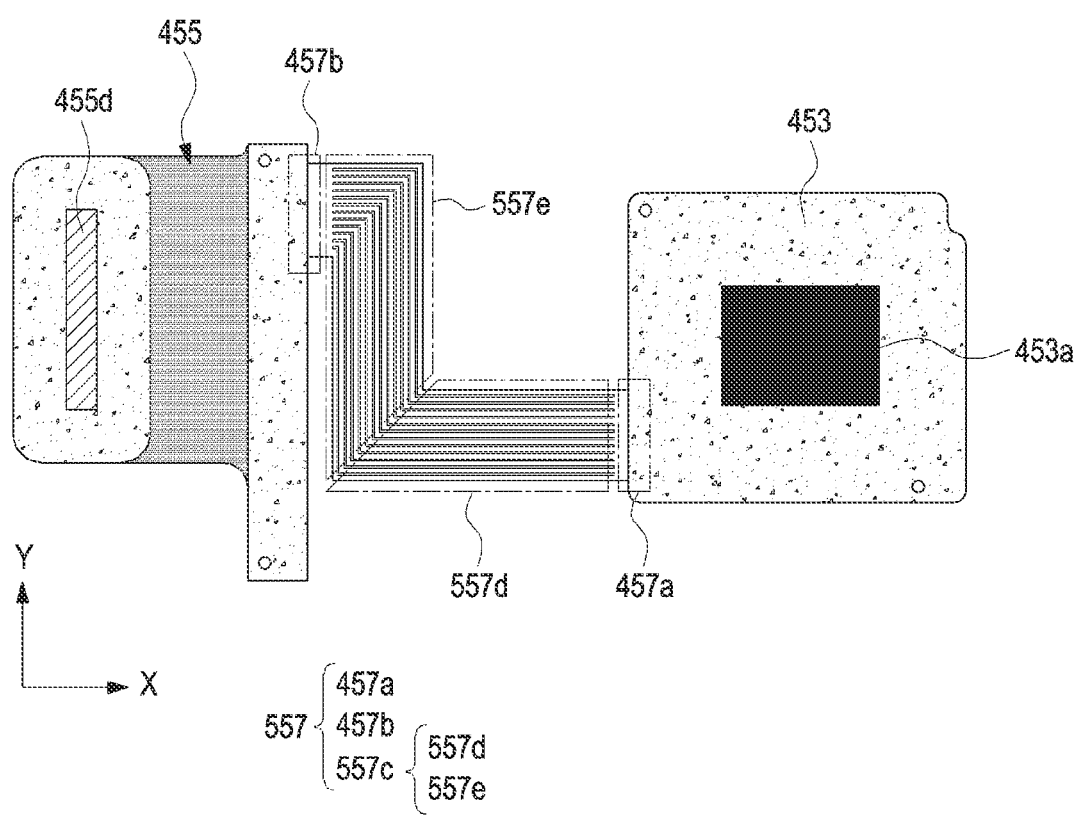
FIG. 7 is a diagram illustrating a plan view illustrating circuit boards of a camera module according to various embodiments.

FIG. 7 is a diagram illustrating a plan view illustrating circuit boards 453, 455, and 557 of a camera module (e.g., the camera module 405 of FIG. 5) according to various embodiments.

Referring to FIG. 7, in the flexible printed circuit board 557, the first section 557d and the second section 557e of the extension(s) 557c may be disposed in an area between the first circuit board 453 and the second circuit board 455. For example, the first section 557d may extend from the first circuit board 453 or the first end portion 457a toward the second circuit board 455 in the first direction (e.g., the X-axis direction), and the second section 557e may be disposed adjacent to the second circuit board 455 while extending between the first section 557d and the second end portion 457b in the second direction (e.g., the Y-axis direction).

Figure 8:
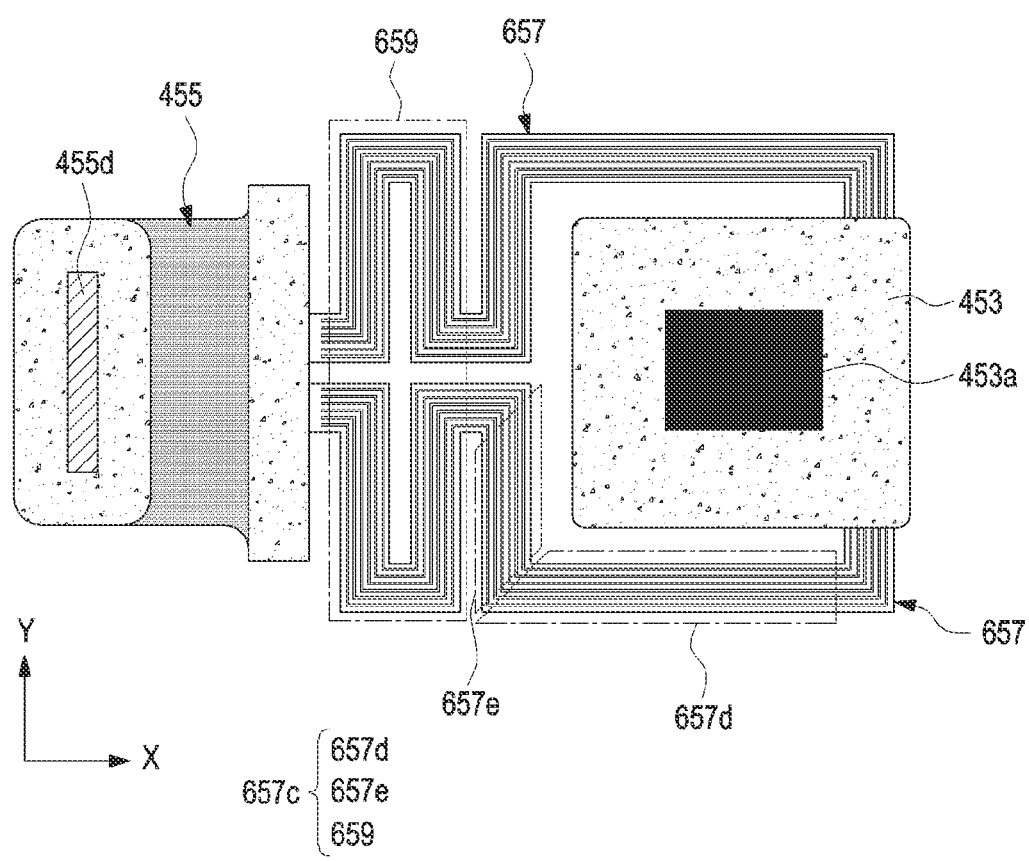
FIG. 8 is a diagram illustrating a plan view illustrating circuit boards of a camera module according to various embodiments.

FIG. 8 is a diagram illustrating a plan view illustrating circuit boards 453, 455, and 657 of a camera module (e.g., the camera module 405 of FIG. 5) according to various embodiments.

Referring to FIG. 8, the camera module 405 may include a pair of flexible printed circuit boards 657, and the first sections 657d of the flexible printed circuit boards 657 (e.g., the extensions 457c of FIG. 6) may extend along a first direction (e.g., the X-axis direction) and may be disposed on the +Y side and/or the −Y side of the first circuit board 453, respectively. In an embodiment, the second section 657e may extend from the first section 657d along the second direction (e.g., the Y-axis direction) and may be disposed on the −X side of the first circuit board 453. In an embodiment, a portion of the flexible printed circuit board 657 or the extension 457c of FIG. 6 may further include a section (hereinafter, referred to as a "fourth section 659") forming a zigzagged shape, a "U" shape, or an "S" shape between the first circuit board 453 and the second circuit board 455. Compared with the embodiment of FIG. 6 or 7, the fourth section 659 may extend, e.g., the length of the flexible printed circuit board 657 or the extension 657c, and as described above through Equation 1 or Equation 2, as the length is extended, the repulsive force of the flexible printed circuit board 657 or the extension 657c may be reduced in optical image stabilization.

Figure 9:
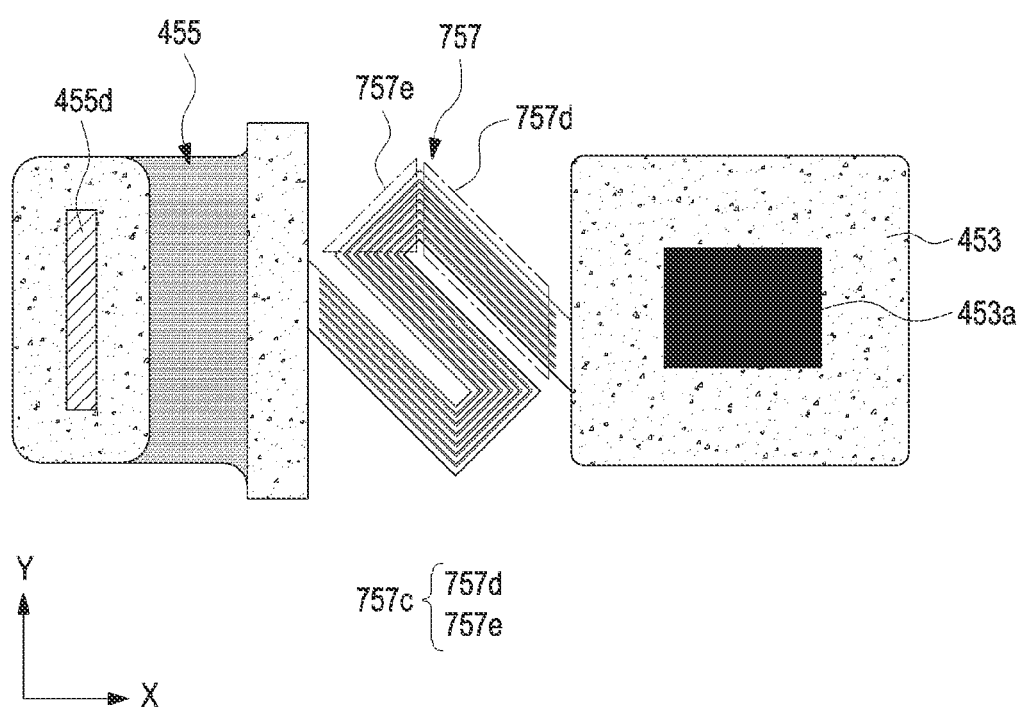
FIG. 9 is a diagram illustrating a plan view illustrating circuit boards of a camera module according to various embodiments.

FIG. 9 is a diagram illustrating a plan view illustrating circuit boards 453, 455, and 757 of a camera module (e.g., the camera module 405 of FIG. 5) according to various embodiments.

Referring to FIG. 9, the flexible printed circuit board 757 may be disposed between the first circuit board 453 and the second circuit board 455, and may have a zigzagged shape or an "S" shape. For example, the flexible printed circuit board 757 or the extension 757c may include at least one first section 757d extending in a direction crossing the X-axis direction or the Y-axis direction, and a second section 757e extending in a direction crossing the first section. The zigzagged shape or the "S" shape may be used to sufficiently secure the length of the flexible printed circuit board 757 or the extension 757c within the limited arrangement area, thereby reducing the repulsive force of the flexible printed circuit board 757 or the extension 757c in optical image stabilization.

Figure 10:
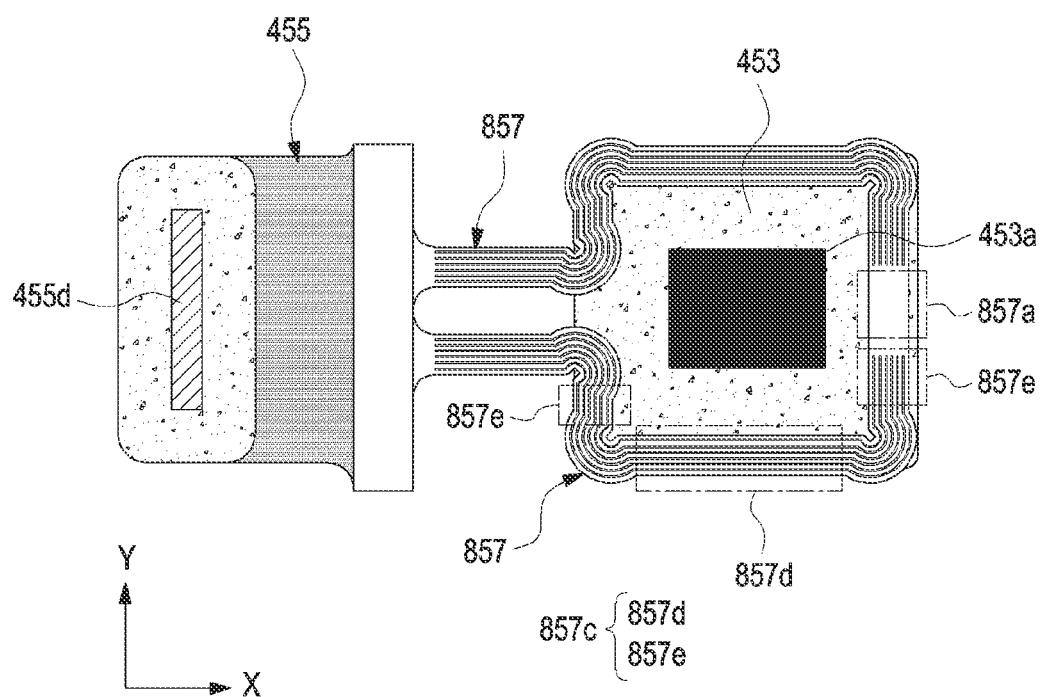
FIG. 10 is a diagram illustrating a plan view illustrating circuit boards of a camera module according to various embodiments.

FIG. 10 is a diagram illustrating a plan view illustrating circuit boards 453, 455, and 857 of a camera module (e.g., the camera module 405 of FIG. 5) according to various embodiments.

Referring to FIG. 10, the flexible printed circuit board 857 may include extensions 857c extending in different directions from a first end portion 857a coupled to the first circuit board 453. The extensions 857c may include, e.g., at least one slit (e.g., the slit 457g of FIG. 6), and may include a first section 857d extending in a first direction (e.g., the X-axis direction) and second sections 857e extending from two opposite ends of the first section 857d in a second direction (e.g., the Y-axis direction). In an embodiment, a pair of first sections 857d may be provided to be disposed on the +Y side and the −Y side of the first circuit board 453, and may be connected to the first end portion 857a through any one of the second sections 857e. The first section 857d or the second section 857e may be disposed substantially along the circumference of the first circuit board 453 or around any one of the side surfaces of the first circuit board 453. In the illustrated embodiment, when viewed in plan view (e.g., when viewed in the Z-axis direction or the optical axis O direction of FIG. 5), the first section 857d or the second section 857e may at least partially overlap the first circuit board 453. In the shape or arrangement of the flexible printed circuit board 857 in the embodiment illustrated in FIG. 10, as compared with the embodiment illustrated in FIG. 6, the flexible printed circuit board 857 or the extension 857c may have an extended length, thereby reducing the repulsive force of the flexible printed circuit board 857 or the extension 857c in optical image stabilization.

Figure 11:
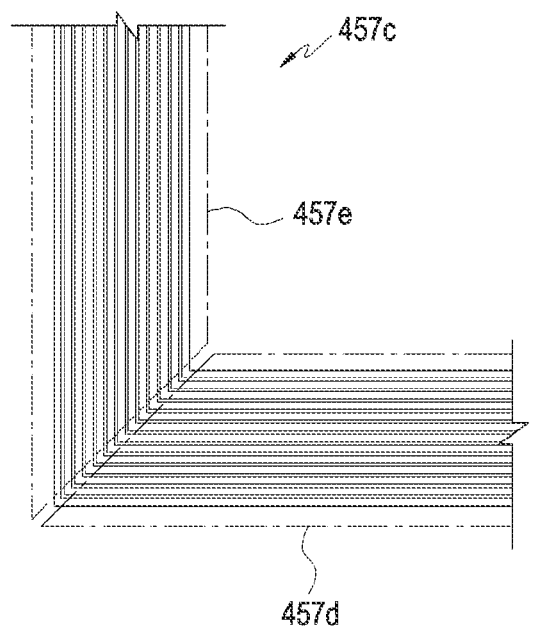
FIG. 11 is a diagram illustrating a plan view illustrating an arrangement of extensions in a camera module according to various embodiments.

FIG. 11 is a diagram illustrating a plan view illustrating an arrangement of extensions 457c in a camera module (e.g., the camera module 405 of FIG. 5) according to various embodiments.

Referring to FIG. 11, a slit (e.g., the slit(s) 457g of FIG. 6) may be formed to substantially correspond to the entire length of the extension 457c. In an embodiment, since the flexible printed circuit board (e.g., the flexible printed circuit board 457 or the extension 457c of FIG. 6) has flexibility, a laser cutting process may be performed in a fixed state using designated equipment. For example, a laser cutting process may be performed in a state capable of suppressing thermal deformation of the flexible printed circuit board 457 or the extension 457c. However, when the width of the extension 457c is reduced to about 120 μm, it may be difficult to secure a space or area capable of irradiating with laser beams while stably fixing the flexible printed circuit board 457 or the extension 457c.

Figure 12:
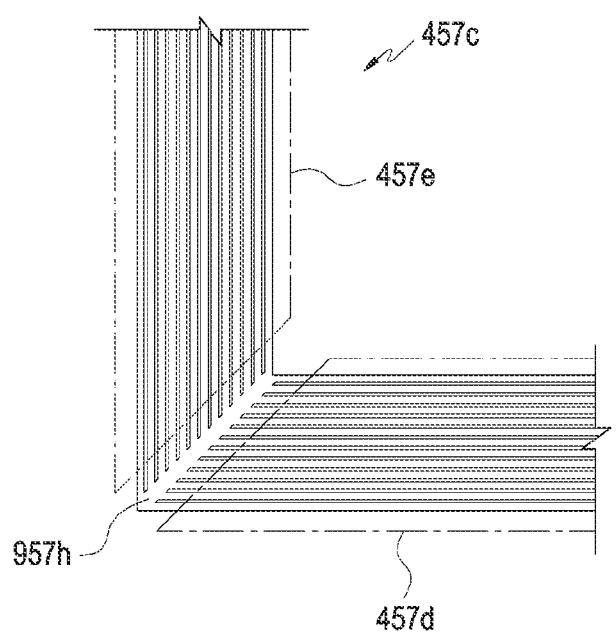
FIG. 12 is a diagram illustrating a plan view illustrating another example of the arrangement of extensions in a camera module according to various embodiments.
Figure 13:
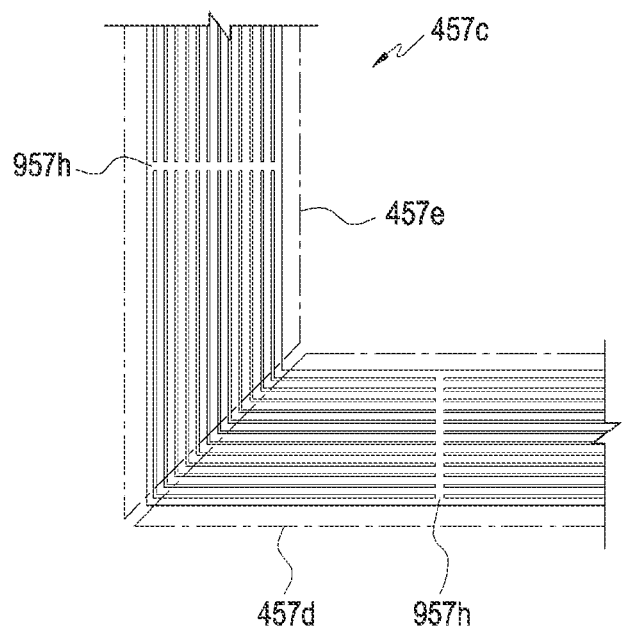
FIG. 13 is a diagram illustrating a plan view illustrating another example of the arrangement of extensions in a camera module according to various embodiments.

FIG. 12 is a diagram illustrating a plan view illustrating another example arrangement of extensions 457c in a camera module (e.g., the camera module 405 of FIG. 5) according to various embodiments. FIG. 13 is a diagram illustrating a plan view illustrating another example arrangement of extensions 457c in a camera module 405 according to various embodiments.

Referring to FIGS. 12 and 13, the flexible printed circuit board 457 and/or the extension 457c may include at least one bridge 957h disposed across at least one slit 457g, and the bridge 957h may connect the at least two adjacent extensions 457c. The bridge 957h may be, e.g., a portion of a base film (e.g., the base film 1057b of FIG. 20) or an insulation layer (e.g., the insulation layer 1057c of FIG. 20) of the flexible printed circuit board 457. The bridge 957h may be disposed between the first section 457d and the second section 457e as illustrated in FIG. 12, and/or may be disposed in each of the first section 457d and the second section 457e as illustrated in FIG. 13. The number and arrangement position of the bridges 957h may be variously selected or combined considering the repulsive force of the flexible printed circuit board 457 or suppressing deformation in the laser cutting process.

Figure 14:
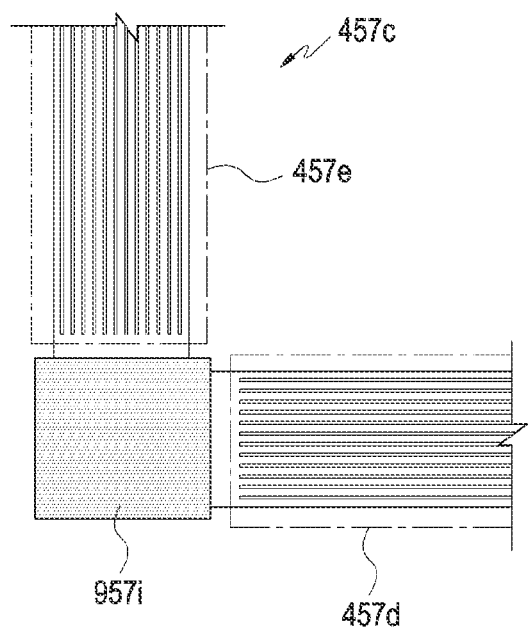
FIG. 14 is diagram illustrating a plan view illustrating another example of the arrangement of extensions in a camera module according to various embodiments.

FIG. 14 is a diagram illustrating a plan view illustrating another example arrangement of extensions 457c in a camera module (e.g., the camera module 405 of FIG. 5) according to various embodiments.

Referring to FIG. 14, the bridge 957h of FIG. 12 or 13 may be replaced with a dummy substrate 957i. For example, the dummy substrate 957i is a type of printed circuit board formed of a rigid material, and may be disposed across at least some of the slits 457g on the extension 457c to connect adjacent extensions 457c. Similar to the embodiment of FIGS. 12 and 13, the shape, number, and/or position of the dummy substrate 957i may be variously selected or combined considering suppressing the repulsive force of the flexible printed circuit board 457 or deformation in the laser cutting process.

Figure 15:
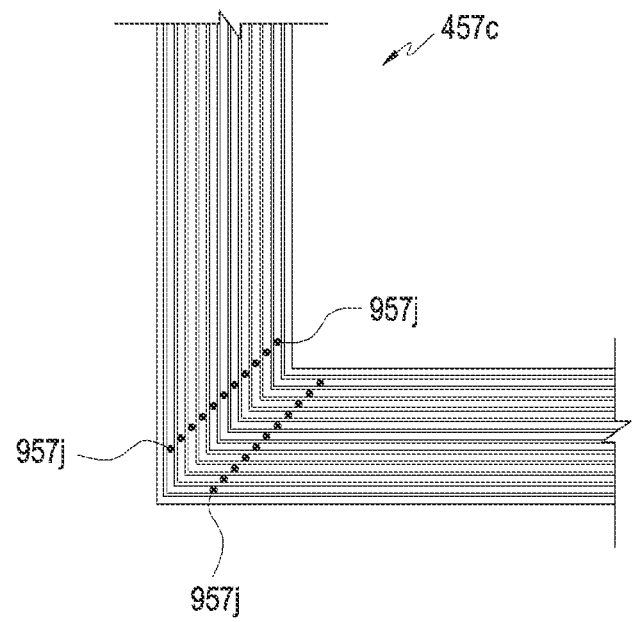
FIG. 15 is a diagram illustrating a plan view illustrating an arrangement of an insulating protrusion(s) in a camera module according to various embodiments.
Figure 16:
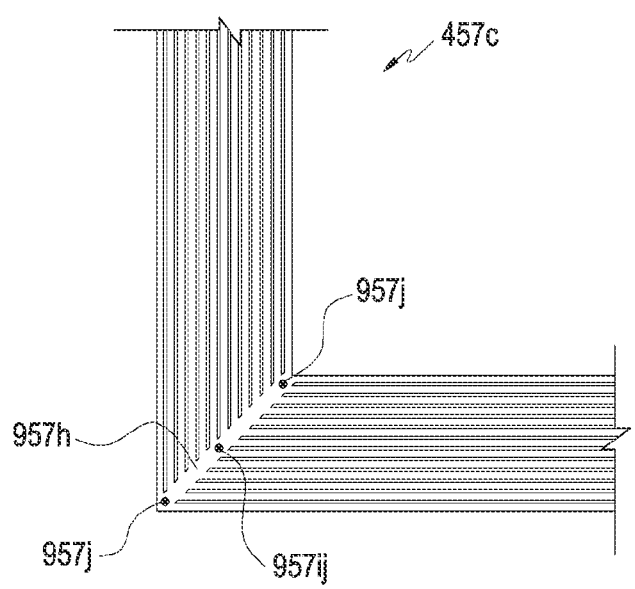
FIG. 16 is a diagram illustrating a plan view illustrating another example of the arrangement of an insulating protrusion(s) in a camera module according to various embodiments.
Figure 17:
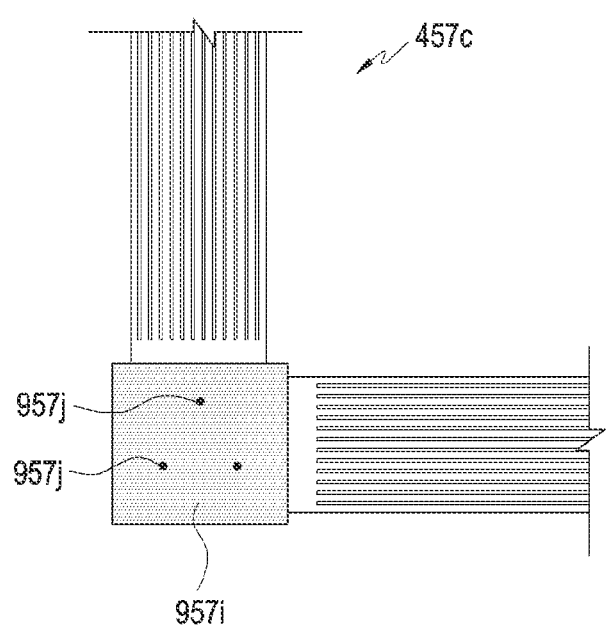
FIG. 17 is a diagram illustrating a plan view illustrating another example of the arrangement of an insulating protrusion(s) in a camera module according to various embodiments.

FIG. 15 is a diagram illustrating a plan view illustrating an arrangement of insulating protrusion(s) 957j in a camera module (e.g., the camera module 405 of FIG. 5) according to various embodiments. FIG. 16 is a diagram illustrating a plan view illustrating another example of the arrangement of an insulating protrusion(s) 957j in a camera module 405 according to various embodiments. FIG. 17 is a diagram illustrating a plan view illustrating another example of the arrangement of an insulating protrusion(s) 957j in a camera module 405 according to various embodiments.

Referring to FIGS. 15, 16 and 17, the flexible printed circuit board 457 may further include at least one insulating protrusion 957j formed on a surface (e.g., a surface facing in the +Z direction or the −Z direction of FIG. 5 on the extension 457c). The insulating protrusion 957j protrudes from the surface of the flexible printed circuit board 457, and may contact another structure when a portion (e.g., the first section 457d or the second section 457e of FIG. 6) of the flexible printed circuit board 457 is deformed or moved in optical image stabilization. The term "other structure" may include, e.g., the casing 459 of FIG. 5 or the first circuit board 453 of FIG. 10.

According to various embodiments, if there is no insulating protrusion 957j, the flexible printed circuit board 457 may make surface contact with another structure while being deformed or moved in optical image stabilization, and the frictional force due to the surface contact may disturb optical image stabilization. According to an embodiment, as the insulating protrusion 957j protrudes from the surface of the flexible printed circuit board 457, the contact area of the flexible printed circuit board 457 may be reduced even when the flexible printed circuit board 457 comes into contact with another structure. For example, the insulating protrusion 957j may smoothly perform optical image stabilization by preventing or alleviating friction. In an embodiment, the insulating protrusion 957j may be disposed considering a portion deformed or moved in optical image stabilization, and may be formed of a material such as silk screen printing ink. In an embodiment, when the flexible printed circuit board 457 includes the bridge 957h or the dummy board 957i, the insulating protrusion 957j may be formed on the surface of the bridge 957h or the dummy board 957i.

Figure 18:
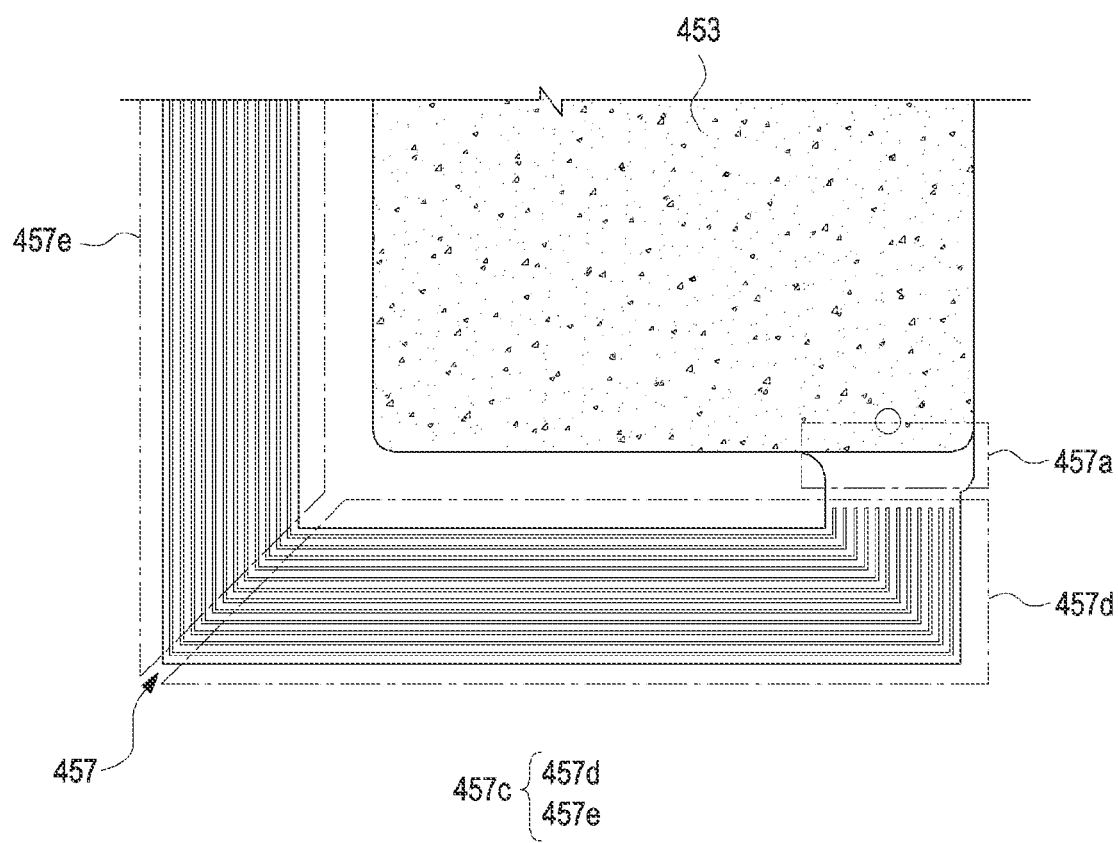
FIG. 18 is a diagram illustrating a plan view illustrating a trajectory of extensions in a camera module according to various embodiments.
Figure 19:
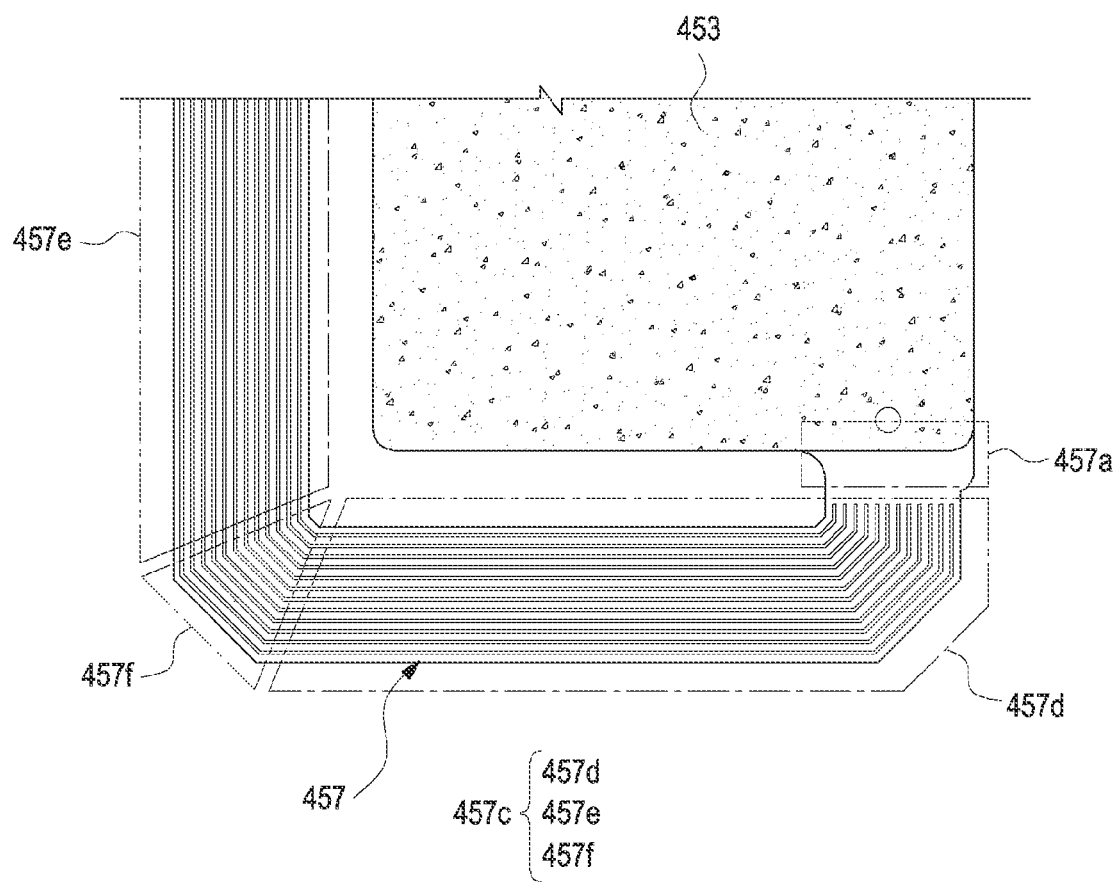
FIG. 19 is a diagram illustrating a plan view illustrating another example of the trajectory of extensions in a camera module according to various embodiments.

FIG. 18 is a diagram illustrating a plan view illustrating a trajectory of extensions 457c in a camera module (e.g., the camera module 405 of FIG. 5) according to various embodiments. FIG. 19 is a diagram illustrating plan view illustrating another example trajectory of extensions 457c in a camera module 405 according to various embodiments.

Referring to FIGS. 18 and 19, as mentioned above, a connection portion between the extension 457c and the first end portion 457a (or the second end portion 457b of FIG. 6), or a connection portion between the first section 457d and the second section 457e in the extension 457c may have various shapes. For example, as illustrated in FIG. 6, the connection portion may include a third section 457f of a curved or arc trajectory, and as illustrated in FIG. 18, the third section 457f may be omitted, and the extension 457c and the first end portion 457a may be directly connected, or the first section 457d and the second section 457e may be directly connected. In an embodiment, as illustrated in FIG. 19, the flexible printed circuit board 457 may include a plurality of third sections 457f extending in a direction inclined with respect to the first section 457d and the second section 457e. One of the third sections 457f may connect the extension 457c and the first end portion 457a, and the other of the third sections 457f may connect the first section 457d and the second section 457e. Although not shown, a connection portion between the second end portion 457b and the extension 457c of the flexible printed circuit board 457 may be variously implemented.

Figure 20:
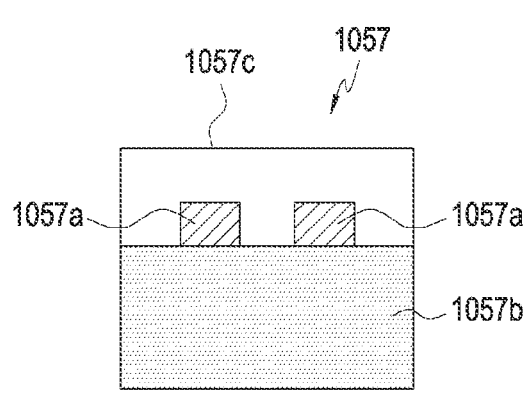
FIG. 20 is a cross-sectional view illustrating one of extensions in a camera module according to various embodiments.

FIG. 20 is a cross-sectional view illustrating one of extensions 1057 (e.g., the extension 457c of FIG. 6) in a camera module (e.g., the camera module 405 of FIG. 5) according to various embodiments.

FIG. 20 is, e.g., a cross-sectional view illustrating any one of a plurality of extensions 1057, and the flexible printed circuit board (e.g., the flexible printed circuit board 457 of FIG. 6) and/or the extension 1057 may include a base film 1057b, an insulation layer 1057c, and/or at least a pair of conducting lines 1057a. The base film 1057b may be formed of, e.g., a polymer material such as polyimide, and the insulation layer 1057c may be formed of a material having a permittivity of about 2.5 or more and about 4.5 or less (e.g., polyimide or liquid crystal polymer (LCP)). In an embodiment, the base film 1057b may be formed of a material forming the insulation layer 1057c. Although it may vary depending on embodiments, the base film 1057b or the insulation layer 1057c may have a thickness of about 20 µm or more and about 50 µm or less.

According to various embodiments, the conducting lines 1057a may be disposed in pairs in one extension 1057, and may be formed of an electrically conductive material such as copper (Cu), gold (Au), or stainless steel. In an embodiment, the conducting line 1057a may have a thickness of about 5 µm or more and about 30 µm or less and may be disposed on the surface of the base film 1057b while being surrounded by the insulation layer 1057c. According to an embodiment, at least one pair of conducting lines 1057a may be disposed in one extension 1057. When the pair of conducting lines 1057a are disposed in one extension 1057, the two conducting lines 1057c may form a power source-power source or power source-ground combination and, in an embodiment, the two conducting lines 1057c may form a signal-signal or signal-ground combination. The flexible printed circuit board 457 may include a plurality of extensions 1057. The flexible printed circuit board 457 may transmit power or signals between the camera module and the processor (e.g., the camera module 405 of FIG. 5 and the processor 120 of FIG. 1) using the conducting lines 1057a disposed in each extension 1057, and may match the MIPI or a camera serial interface (CSI) in transmitting power or signals.

According to various embodiments, the two conducting lines 1057a in one extension 1057 may be used as a reference for impedance matching with respect to each other, and impedance matching may be performed with differential signals or a single signal. In this impedance matching, the permittivity and thickness of the base film 1057b and the insulation layer 1057c and/or the thickness of the conducting line 1057a may be considered. As is described below, one extension 1057 may be provided with at least one conductive layer (e.g., the conductive layer 1057d of FIGS. 21 to 23) in addition to the two conducting lines, and the conductive layer 1057d may be used as a reference for impedance matching of the conducting lines 1057a. According to an embodiment, through such impedance matching, the flexible printed circuit board 457 may provide a high-capacity, high-rate signal transmission environment matching the MIPI or CSI between the first circuit board and the second circuit board (e.g., the first circuit board 453 and the second circuit board 455 of FIG. 6).

FIGS. 21, 22, 23, 24, 25, 26, 27, 28, 29 and 31 are cross-sectional views illustrating extensions (e.g., the flexible printed circuit board 457 or extension 457c of FIG. 6) in a camera module (e.g., the camera module 405 of FIG. 5) according to various embodiments.

Figure 21:
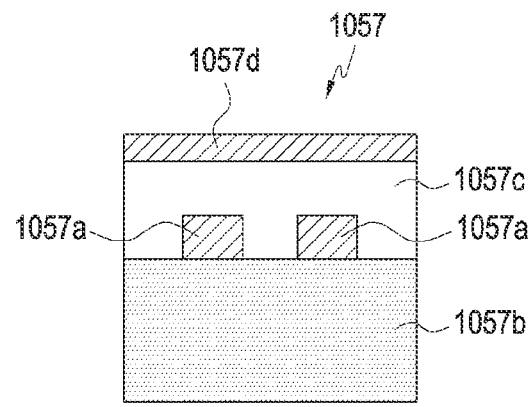
Figure 22:
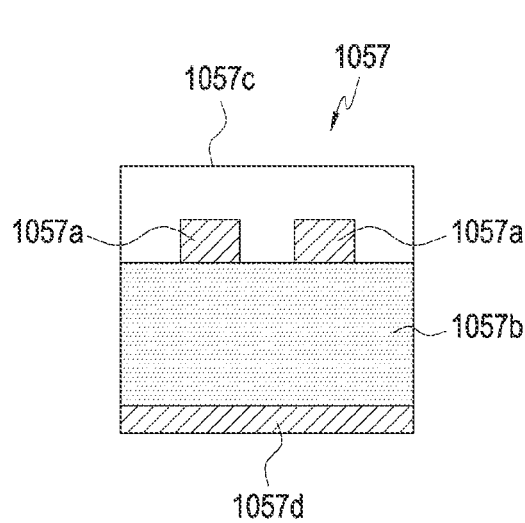
Figure 23:
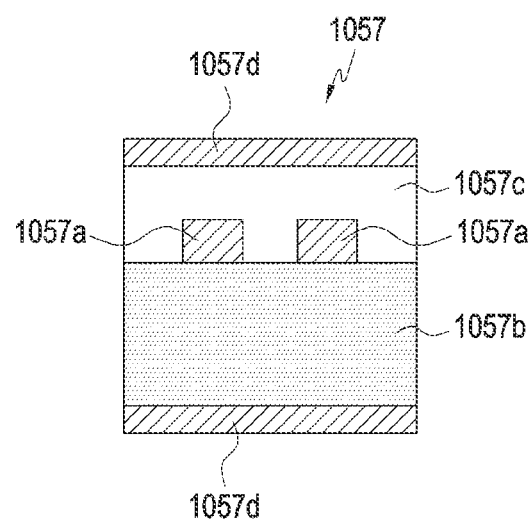
Figure 28:
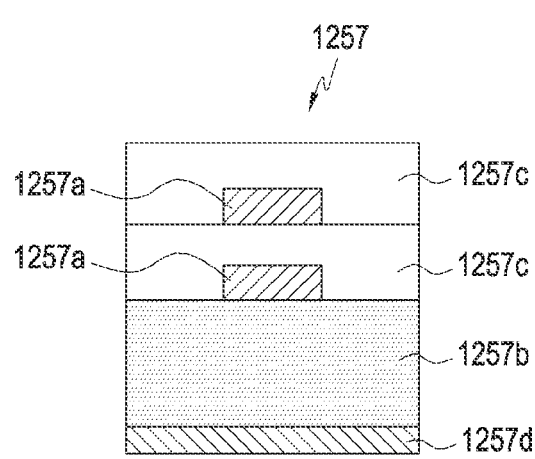
Figure 29:
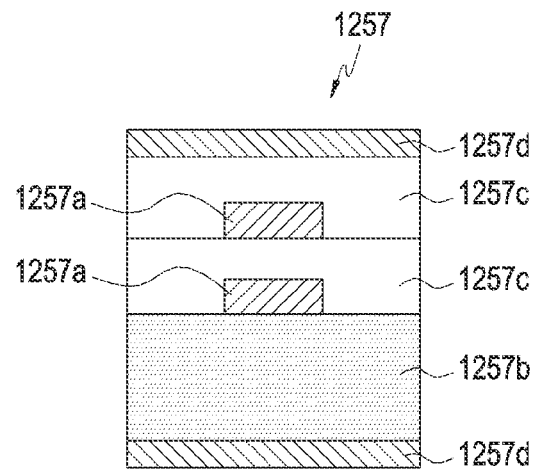

Referring to FIGS. 21, 22 and 23, the flexible printed circuit board 457 or the extension 1057 may include conductive layer(s) 1057d disposed on at least one of an upper surface (e.g., a surface of the insulation layer 1057c) or a lower surface (e.g., a surface of the base film 1057b). The conductive layer(s) 1057d may be provided as, e.g., a ground conductor or an electromagnetic shielding structure, and may have a width greater than that of the conducting line 1057a. In an embodiment, the conductive layer 1057d may have substantially the same width as the base film 1057b or the insulation layer 1057c. For example, when viewed in a direction (e.g., the Z-axis direction of FIG. 5) parallel to the optical axis O, the edge of the conductive layer 1057d may be at least partially aligned with the edge of the extension 1057 (e.g., the edge of the base film 1057b or the insulation layer 1057c). In an embodiment, the conducting lines 1057a may be formed by forming a metal layer similar to the conductive layer 1057d on the surface of the base film 1057b and then partially removing the same. In an embodiment, the conductive layer 1057d formed on the base film 1057b may set a position or area for irradiating with a laser beam to form a position or slit (e.g., the slit 457g of FIG. 6) forming the conducting line 1057a. In an embodiment, at least one of the conductive layers 1057d may be utilized as a reference for impedance matching of the conducting lines 1057a.

Referring to FIGS. 24 and 25, the extension 1157 may include conducting lines 1157a disposed on the upper surface and the lower surface, respectively, of the base film 1157b, and the insulation layers 1157c may be formed on two opposite surfaces of the base film 1157b to surround the conducting lines 1157a. According to an embodiment, the flexible printed circuit board 457 and/or the extension 1157 may further include conductive layer(s) 1157d formed on at least one of an upper surface or a lower surface (e.g., a surface of the insulation layer 1157c). The conductive layer 1157d may be provided as, e.g., a ground conductor or an electromagnetic shielding structure. Similar to the previous embodiment, any one of the conducting lines 1157a may be utilized as a reference for impedance matching of the other. When the conductive layer 1157d is provided, impedance matching of the conducting lines 1157a may be performed with respect to the conductive layer 1157d.

Referring to FIGS. 26, 27, 28 and 29, the extension 1257 may include one conducting line 1257a disposed on the surface of the base film 1257b while being surrounded by the insulation layer 1257c, and another conducting line 1257a disposed on the surface of the insulation layer 1257c while being surrounded by another insulation layer 1257c. For example, in one extension 1257, the conducting lines 1257a may be disposed in different layers. In an embodiment, the extension 1257 may further include conductive layer(s) 1257d disposed on at least one of an upper surface and a lower surface. The conductive layer 1257d may be provided as, e.g., a ground conductor or an electromagnetic shielding structure. Similar to the previous embodiment, any one of the conducting lines 1257a may be utilized as a reference for impedance matching of the other. When the conductive layer 1257d is provided, impedance matching of the conducting lines 1257a may be performed with respect to the conductive layer 1257d.

Figure 30:
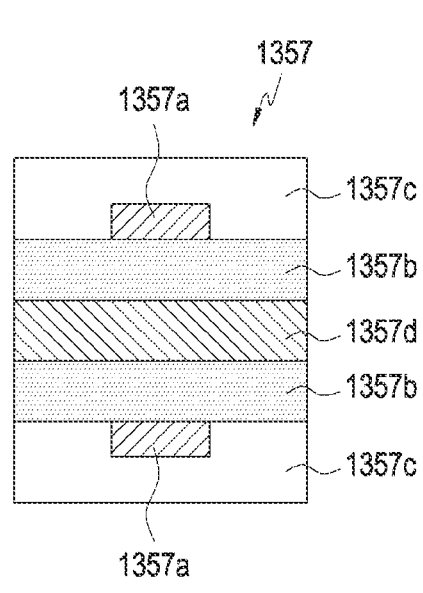
Figure 31:
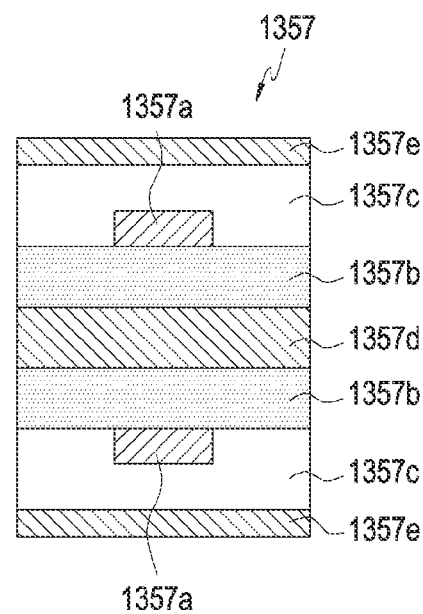

Referring to FIGS. 30 and 31, the extension 1357 may include a first conductive layer 1357d and base films 1357b coupled to face each other with the first conductive layer 1357d interposed therebetween. The conducting lines 1357a may be disposed on surfaces, respectively, of any one of the two base films 1357b while being surrounded by the insulation layer 1357c. According to an embodiment, the extension 1357 may further include the second conductive layer(s) 1357e provided on at least one of the upper surface or the lower surface. In an embodiment, when the first conductive layer 1357d and/or the second conductive layer 1357e are viewed in a direction (e.g., the Z-axis direction of FIG. 5) parallel to the optical axis (e.g., the optical axis O of FIG. 5), the edges of the conductive layer(s) 1357d and 3157e may be at least partially aligned with the edge of the extension 1357 (e.g., the edge of the base film 1357b or the insulation layer 1357c). For example, the first conductive layer 1357d may be visually exposed (e.g., visible) to the outside of the extension 1357 between the base films 1357b.

In the above-described embodiment, the conductive layers (e.g., the conductive layers 1057d of FIGS. 21 to 23) may define a position or area where a laser beam is to be radiated to form the position or slit (e.g., the slit 457g of FIG. 6) where the conducting lines (e.g., the conducting line 1057a of FIGS. 21 to 23) are to be formed. When the conductive layers 1057d are provided on the upper and lower surfaces of the flexible printed circuit board 457 or the extensions 457c and 1057, the conducting lines 1057a may be disposed substantially in an area between the conductive layers 1057d, and the conductive layers 1057d may function as an electromagnetic shielding structure. For example, while high-rate signal transmission is performed through the conducting lines 1057a, the conductive layers 1057d may provide a stable signal transmission environment.

Figure 32:
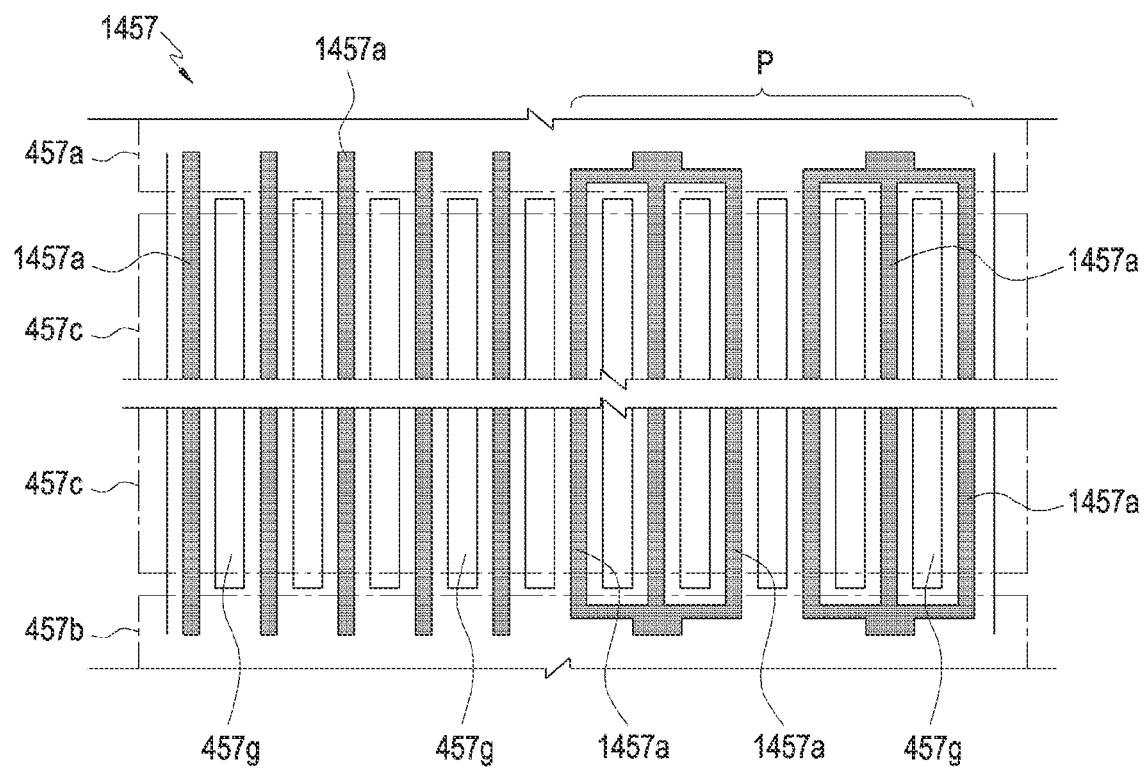
FIG. 32 is a diagram illustrating a plan view illustrating connection of conducting lines in a camera module according to various embodiments.

FIG. 32 is a diagram illustrating a plan view illustrating connection of conducting lines 1457a (e.g., the conducting line 1057a of FIGS. 20 to 23) in a camera module (e.g., the camera module 405 of FIG. 5) according to various embodiments.

Referring to FIG. 32, as described above, at least one pair of conducting lines 1457a may be disposed in one extension 457c and 1057, and two or more conducting lines selected from among the conducting lines 1457a disposed in different extensions 457c and 1057 may be connected in parallel P. For example, the conducting lines 1457a may be substantially disposed in the extensions 457c and 1057, respectively, and at least one pair of the conducting lines 1457a may be merged at the first end portion 457a or the second end portion 457b (e.g., the first circuit board 453 or the second circuit board 455 of FIG. 6) to be connected in parallel P. According to an embodiment, when power or a signal is transferred between the first end portion 457a and the second end portion 457b, as the width of the conducting line 1457a decreases, the line resistance may increase, so that the power efficiency may be further reduced. For example, power loss may increase in supplying power through the flexible printed circuit board 1457. In the above-described embodiment, by forming the slit 457g in the flexible printed circuit board 1457, it is possible to reduce the repulsive force in optical image stabilization. However, as the width of the extension 457c decreases, the width of the conducting line 1457a is also limited, and thus the line resistance may increase. According to various embodiments of the disclosure, it is possible to prevent and/or reduce power loss due to line resistance by connecting some selected from among the conducting lines 1457a, e.g., the conducting lines 1457a disposed in at least two adjacent extensions 457c, in parallel P. For example, by supplying power using the conducting lines 1457a connected in parallel P, it is possible to prevent and/or reduce a decrease in efficiency in transmitting power through the flexible printed circuit board 1457.

According to various example embodiments, an electronic device and/or a processor (e.g., the electronic device 101, 102, 104, 200, or 300 of FIGS. 1 to 4 and/or the processor 120) may include a camera module (e.g., the camera module 180, 205, 212, 213, or 405 of FIG. 1 to 3 or 5) that receives external light from one surface or another surface (e.g., the first surface 210A or the second surface 210B of the housing 210 of FIGS. 2 and 3) of the housing, and the camera module may include the above-described flexible printed circuit board (e.g., the flexible printed circuit board 457 or 1457 of FIG. 6 or 32) and/or an extension (e.g., the extension 457c of FIG. 6 or 32). For example, in the capturing mode, the electronic device and/or the processor may obtain an object image or video using the camera module. In an embodiment, when the camera module has an optical image stabilization function, the electronic device and/or the processor may detect a vibration of the housing using a sensor module (e.g., the sensor module 176 of FIG. 1), e.g., a gyro sensor or an acceleration sensor, and may perform optical image stabilization based on the detected vibration. The term "optical image stabilization" may refer, for example, to, an operation of horizontally moving a first circuit board (e.g., the first circuit board 453 of FIG. 6) on the plane substantially perpendicular to the optical axis.

According to various embodiments, the vibration of the housing may be caused by a vibration generated in a general use environment and a vibration of a fixing device or the user's body in the actual capturing mode. The electronic device and/or the processor may identify whether the vibration detected through the sensor module is the shaking of the user's hand. For example, data about the direction, speed, or amplitude of the vibration caused by the fixing device or the shaking of the hand may be stored in the memory, and the electronic device and/or the processor may identify the vibration in a general use environment and the shaking of the fixing device or the user's hand by comparing the detected vibration with the data stored in the memory.

According to various embodiments, in optical image stabilization, the first circuit board may move or reciprocate along at least one of the first direction and the second direction (e.g., the X-axis direction or the Y-axis direction of FIG. 6). The moving or reciprocating direction of the first circuit board may be opposite to the direction of the vibration caused by the shaking of the hand. In an embodiment, when the first circuit board moves in the first direction (e.g., the X-axis direction of FIG. 6), the first portion (e.g., the second section 457e of FIG. 6) of the extension may be moved or deformed, allowing the movement of the first circuit board. When the first circuit board moves in the second direction (e.g., the Y-axis direction of FIG. 6), the second portion (e.g., the first section 457d of FIG. 6) of the extension may be moved or deformed, allowing the movement of the first circuit board. In an embodiment, when the first circuit board moves in a direction crossing the first direction and the second direction, the first portion and the second portion of the extension may be simultaneously moved or deformed, allowing the movement of the first circuit board.

According to various example embodiments of the disclosure, a camera module (e.g., the camera module 180, 205, 212, 213, or 405 FIG. 1 to 3 or 5) and/or an electronic device (e.g., the electronic device 101, 102, 104, 200, or 300 of FIGS. 1 to 4) including the same may comprise: a lens assembly (e.g., the lens assembly 451 of FIG. 5) including at least one lens (e.g., the lens 451a of FIG. 5) aligned on an optical axis (e.g., the optical axis O of FIG. 5), a first circuit board (e.g., the first circuit board 453 of FIG. 5 or 6) including an image sensor (e.g., the image sensor 453a of FIG. 5 or 6) disposed on the optical axis and disposed to be movable in two directions (e.g., the X-axis direction and the Y-axis direction), the two directions crossing each other on a plane perpendicular to the optical axis, a second circuit board (e.g., the second circuit board 455 of FIG. 6) having at least one connector (e.g., the connector 455d of FIG. 6) disposed thereon, and a flexible printed circuit board (e.g., the flexible printed circuit board 457 or 1457 of FIG. 6 or 32) electrically connecting the first circuit board and the second circuit board. The flexible printed circuit board may include a first end portion (e.g., the first end portion 457a of FIG. 6 or 32) coupled to the first circuit board, a second end portion (e.g., the second end portion 457b of FIG. 6 or 32) coupled to the second circuit board, a plurality of extensions (e.g., the extension 457c of FIG. 6 or 32) extending from the first end portion and connected to the second end portion, at least one slit (e.g., the slit 457g of FIG. 6) disposed between two adjacent extensions among the plurality of extensions, and a plurality of conducting lines (e.g., the conducting line 1057a or 1457a of FIG. 20 or 14) disposed in the plurality of extensions. Two or more selected from among the conducting lines disposed in different extensions may be connected in parallel.

According to various example embodiments, the conducting lines connected in parallel may be configured to be merged on the first circuit board to supply power.

According to various example embodiments, at least a pair of conducting lines may be disposed in one extension.

According to various example embodiments, the conducting lines in one extension may be configured to be impedance-matched with respect to each other.

According to various example embodiments, when viewed in a direction parallel to the optical axis, a width of the slit may be less than a width of the extension.

According to various example embodiments, the extension may include a first section (e.g., the first section 457d of FIG. 6) extending along a first direction of the two directions crossing each other and a second section (e.g., the second section 457e of FIG. 6) extending along a second direction of the two directions crossing each other.

According to various example embodiments, the extension may further include a third section (e.g., the third section 457f of FIG. 6 or 19) connecting the first section and the second section. The third section may have an arc shape or be disposed to be inclined with respect to the two directions crossing each other.

According to various example embodiments, the first section or the second section may be disposed around at least one side surface of the first circuit board or, when viewed in a direction of the optical axis, the first section or the second section may be disposed to at least partially overlap the first circuit board.

According to various example embodiments, the flexible printed circuit board may include at least one base film (e.g., the base film 1057b of FIGS. 20 to 23) and at least one insulation layer (e.g., the insulation layer 1057c of FIGS. 20 to 23). At least one of the conducting lines may be disposed on one surface of the base film and be surrounded by the insulation layer.

According to various example embodiments, the flexible printed circuit board may further include a base film including a first surface and a second surface facing in a direction opposite to the first surface, an insulation layer disposed on the first surface, and at least one conductive layer formed on the second surface or a surface of the insulation layer. At least one of the conducting lines may be disposed on the first surface while being surrounded by the insulation layer. When viewed in a direction parallel to the optical axis, an edge of the conductive layer may be at least partially aligned with an edge of the extension.

According to various example embodiments, the flexible printed circuit board may further include a first conductive layer (e.g., the first conductive layer 1357d of FIG. 30 or 31), base films (e.g., the base film 1357b of FIG. 30 or 31) coupled to face each other with the first conductive layer disposed therebetween, and insulation layers (e.g., the insulation layer 1357c of FIG. 30 or 31) formed on surfaces of the base films. The conducting lines may be formed on a surface of any one of the base films while being surrounded by any one of the insulation layers. A side portion of the first conductive layer may be visually exposed (e.g., visible) to an outside of the extension between the base films.

According to various example embodiments, the base films or the insulation layers may have a permittivity of 2.5 or more and 4.5 or less and to have a thickness of 20 μm or more and 50 μm or less, and the conductive layer or the conducting lines may include at least one of copper, gold, or stainless steel and may be formed to have a thickness of 5 μm or more and 30 μm or less.

According to various example embodiments, the flexible printed circuit board may further include a second conductive layer (e.g., the second conductive layer 1357e of FIG. 30 or 31) formed on a surface of the insulation layers, and the conducting lines may be disposed in an area between the second conductive layers.

According to various example embodiments, the flexible printed circuit board may further include at least one rigid printed circuit board (e.g., the dummy substrate 957i of FIG.

14) or at least one bridge (e.g., the bridge 957*h* of FIG. 12 or 13) disposed to connect at least two adjacent extensions among the extensions across at least one slit.

According to various example embodiments, the flexible printed circuit board may further include at least one insulating protrusion (e.g., the insulating protrusion 957*j* of FIGS. 15 to 17) formed on at least one of a surface of the extension, a surface of the bridge, or a surface of the rigid printed circuit board.

According to various example embodiments, the two directions may not be parallel to each other.

According to various example embodiments of the disclosure, an electronic device (e.g., the electronic device 101, 102, 104, 200, or 300 of FIGS. 1 to 4) may comprise: a housing (e.g., the housing 210 of FIG. 2) and the camera module (e.g., the camera module 180, 205, 212, 213, or 405 of FIGS. 1 to 3 or FIG. 5) as described above and configured to receive external light from one surface (e.g., the first surface 210A of FIG. 2) of the housing or another surface (e.g., the second surface 210B of FIG. 3) facing in a direction opposite to the one surface.

According to various example embodiments, the electronic device may further comprise at least one processor (e.g., the processor 120 of FIG. 1), one or more of the at least one processor configured to obtain an object image using the camera module in a capture mode.

According to various embodiments, the electronic device may further comprise a sensor module (e.g., the sensor module 176 of FIG. 1) comprising at least one sensor configured to detect a vibration of the housing by an external force and at least one processor. One or more of the at least one processor may be configured to identify shaking of a user's hand based on the vibration detected by the sensor module and move the first circuit board in at least one of the two directions based on the identified shaking of the user's hand.

According to various example embodiments, a first portion (e.g., the second section 457*e* of FIG. 6) of the extension may be configured to move or deform based on the first circuit board moving in a first direction (e.g., the X-axis direction of FIG. 6) of the two directions, and a second portion (e.g., the first section 457*d* of FIG. 6) different from the first portion of the extension may be configured to move or deform based on the circuit board moving in a second direction (e.g., the Y-axis direction of FIG. 6) different from the first direction of the two directions.

While the disclosure has been illustrated and described with reference to various example embodiments thereof, it will be understood that the various example embodiments are intended to be illustrative, and not limiting. It will be further apparent to those of ordinary skill in the art that various changes in form and detail may be made thereto without departing from the spirit and scope of the disclosure including the following claims and their equivalents. It will also be understood that any of the embodiment(s) described herein may be used in conjunction with any other embodiment(s) described herein.

What is claimed is:

1. A camera module, comprising:
   a lens assembly including at least one lens aligned on an optical axis;
   a first circuit board including an image sensor disposed on the optical axis and disposed to be movable in two directions, the two directions crossing each other on a plane perpendicular to the optical axis;
   a second circuit board having at least one connector disposed thereon; and
   a flexible printed circuit board electrically connecting the first circuit board and the second circuit board, wherein the flexible printed circuit board includes:
   a first end portion coupled to the first circuit board;
   a second end portion coupled to the second circuit board;
   a plurality of extensions extending from the first end portion and connected to the second end portion;
   at least one slit disposed between two adjacent extensions among the plurality of extensions; and
   a plurality of conducting lines disposed in the plurality of extensions,
   wherein two or more selected from among the conducting lines disposed in different extensions are electrically connected in parallel between the first end portion and the second end portion.

2. The camera module of claim 1, wherein the conducting lines connected in parallel are configured to be merged on the first circuit board to supply power.

3. The camera module of claim 1, wherein at least a pair of conducting lines are disposed in one extension.

4. The camera module of claim 3, wherein the conducting lines in one extension are configured to be impedance-matched with respect to each other.

5. The camera module of claim 1, wherein when viewed in a direction parallel to the optical axis, a width of the slit is less than a width of the extension.

6. The camera module of claim 1, wherein the extension includes:
   a first section extending along a first direction of the two directions crossing each other; and
   a second section extending along a second direction of the two directions crossing each other.

7. The camera module of claim 6, wherein the extension further includes a third section connecting the first section and the second section, and wherein the third section has an arc shape or is disposed to be inclined with respect to the two directions crossing each other.

8. The camera module of claim 6, wherein the first section or the second section is disposed around at least one side surface of the first circuit board or, when viewed in a direction of the optical axis, the first section or the second section are disposed to at least partially overlap the first circuit board.

9. The camera module of claim 1, wherein the flexible printed circuit board further includes:
   a base film including a first surface and a second surface facing a direction opposite to the first surface;
   an insulation layer disposed on the first surface; and
   at least one conductive layer formed on the second surface or a surface of the insulation layer,
   wherein at least one of the conducting lines is disposed on the first surface and surrounded by the insulation layer, and
   wherein when viewed in a direction parallel to the optical axis, an edge of the conductive layer is at least partially aligned with an edge of the extension.

10. The camera module of claim 1, wherein the flexible printed circuit board includes:
    a first conductive layer;
    base films coupled to face each other with the first conductive layer disposed therebetween; and
    insulation layers formed on surfaces of the base films,
    wherein the conducting lines are formed on a surface of any one of the base films and surrounded by any one of the insulation layers, and wherein a side portion of the first conductive layer is visible to an outside of the extension between the base films.

11. The camera module of claim 1, wherein the flexible printed circuit board further includes at least one rigid printed circuit board or at least one bridge disposed to connect at least two adjacent extensions among the extensions across at least one slit.

12. The camera module of claim 11, wherein the flexible printed circuit board further includes at least one insulating protrusion formed on at least one of a surface of the extension, a surface of the bridge, or a surface of the rigid printed circuit board.

13. An electronic device, comprising:

a housing; and the camera module of claim 1, the camera module configured to receive external light from one surface of the housing or another surface facing in a direction opposite to the one surface; and at least one processor, wherein one or more of at least one processor is configured to obtain an object image using the camera module in a capture mode.

14. The electronic device of claim 13, further comprising a sensor module comprising at least one sensor configured to detect a vibration of the housing by an external force, wherein one or more of the at least one processor is configured to:

identify shaking based on the vibration detected by the sensor module; and move the first circuit board in at least one of the two directions based on the identified shaking.

15. The electronic device of claim 14, wherein a first portion of the extension is configured to move or deform based on the first circuit board moving in a first direction of the two directions, and wherein a second portion different from the first portion of the extension is configured to move or deform based on the circuit board moving in a second direction different from the first direction of the two directions.

* * * * *